United States Patent
Tanaka et al.

(10) Patent No.: US 9,065,550 B2
(45) Date of Patent: Jun. 23, 2015

(54) RECEPTION APPARATUS

(71) Applicant: Sony Corporation, Tokyo (JP)

(72) Inventors: Katsuyuki Tanaka, Kanagawa (JP); Masato Kita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/078,674

(22) Filed: Nov. 13, 2013

(65) Prior Publication Data
US 2014/0169410 A1 Jun. 19, 2014

(30) Foreign Application Priority Data

Dec. 14, 2012 (JP) ................................ 2012-273558

(51) Int. Cl.
*H04B 1/00* (2006.01)
*H04B 1/10* (2006.01)
*H04B 1/7097* (2011.01)
*G01S 19/21* (2010.01)
*G01S 19/37* (2010.01)

(52) U.S. Cl.
CPC .............. *H04B 1/7097* (2013.01); *G01S 19/21* (2013.01); *G01S 19/37* (2013.01)

(58) Field of Classification Search
CPC .. H04B 1/1036; H04B 1/0017; H04B 1/0075; H04B 1/1027; H04B 1/109; H04L 25/08; H03H 21/0012
USPC ........................... 375/316, 340–341, 346–350
See application file for complete search history.

(56) References Cited

U.S. PATENT DOCUMENTS

| 5,974,101 | A | * | 10/1999 | Nago | 375/350 |
| 7,463,704 | B1 | * | 12/2008 | Tehrani et al. | 375/345 |
| 7,839,313 | B2 | * | 11/2010 | Kidambi | 341/118 |
| 2013/0083876 | A1 | * | 4/2013 | Suzuki et al. | 375/350 |

FOREIGN PATENT DOCUMENTS

| JP | 07-128423 A | 5/1995 |
| JP | 2009-206603 A | 9/2009 |

* cited by examiner

*Primary Examiner* — Khanh C Tran
(74) *Attorney, Agent, or Firm* — Hazuki International, LLC

(57) ABSTRACT

A reception apparatus includes an intermediate frequency converter, an analog-to-digital converter, a plurality of noise removing units, and a controller. The intermediate frequency converter converts a plurality of transmission signals in different frequency bands into a plurality of intermediate frequency signals having different intermediate frequencies, the plurality of transmission signals each being obtained by demodulating a spectrum-spread spectrum spread signal. The analog-to-digital converter discretizes the plurality of intermediate frequency signals and outputs a plurality of discretization signals. The plurality of noise removing units remove a noise other than a normal thermal noise included in the plurality of discretization signals from the plurality of discretization signals. The controller detects the noise included in the plurality of discretization signals and sets assignment of the plurality of noise removing units to the plurality of discretization signals based on a detection result thereof.

9 Claims, 13 Drawing Sheets

RECEPTION APPARATUS

CROSS REFERENCE TO RELATED APPLICATIONS

This application claims the benefit of Japanese Priority Patent Application JP 2012-273558 filed Dec. 14, 2012, the entire contents of which are incorporated herein by reference.

BACKGROUND

The present disclosure relates to a reception apparatus, and more particularly to a reception apparatus capable of suppressing an increase in the circuit scale while reducing an external noise therein, the reception apparatus receiving a plurality of transmission signals in different frequency bands.

In recent years, global positioning system (GPS) functions are mounted in various electronic apparatuses including a car navigation system, a portable communication apparatus such as a cellular phone, a digital still camera, and the like. A GPS receiver that realizes the GPS function receives, for example, a transmission signal called a GPS L1 C/A code that is transmitted from four or more GPS satellites and determines a position based on the received transmission signal.

In this case, a transmission signal transmitted from each GPS satellite is a signal obtained by performing a binary phase shift keying (BPSK) modulation on a carrier of 1575.42 MHz, based on a spectrum spread signal that is obtained by subjecting data of 50 bps to a spectrum spread using a Gold code where a code length is 1023 and a chip rate is at 1.023 MHz.

Meanwhile, such an electronic apparatus having a GPS function has multifunction and high performance, and unnecessary radiation generated in the electronic apparatus increases. The unnecessary radiation generated in the electronic apparatus corresponds to a kind of an external noise for a GPS receiver of the electronic apparatus. Representative examples that become factors of the external noise due to the unnecessary radiation may include a clock signal that interferes through coupling or space between wiring lines in the electronic apparatus, harmonics due to a high speed signal that passes through a data bus or the like, a variation in load of a circuit, and a variation in power due to a switching regulator. In view of this, a GPS reception apparatus provided with a noise removing function of removing such an external noise is proposed (see, for example, Japanese Patent Application Laid-open No. 2009-206603 (hereinafter, referred to as Patent Document 1)).

By the way, a positioning system that determines a self-position and a speed of a moving body or the like includes, in addition to the GPS, a global orbiting navigation satellite system (GLONASS) developed and operated in Russia and the like. Therefore, a reception apparatus that receives two transmission signals for the GPS and the GLONASS is also proposed (see, for example, Japanese Patent Application Laid-open No. HEI 7-128423 (hereinafter, referred to as Patent Document 2)). In this case, the carrier frequency of the transmission signal of the GLONASS is, for example, 1602.00 MHz and different from the frequency band of the transmission signal of the GPS, and hence it is necessary to process the GPS signal and the GLONASS signal through separated signal paths.

SUMMARY

If the reception apparatus that receives a plurality of transmission signals in different frequency bands as disclosed in Patent Document 2 is provided with the noise removing function, there is a fear that the circuit scale increases. An excessively large circuit can be provided in an electronic apparatus designed to have a small noise.

In view of the above-mentioned circumstances, it is desirable to suppress an increase in the circuit scale while reducing an external noise in a reception apparatus that receives a plurality of transmission signals in different frequency bands.

According to an embodiment of the present disclosure, there is provided a reception apparatus including: an intermediate frequency converter configured to convert a plurality of transmission signals in different frequency bands into a plurality of intermediate frequency signals having different intermediate frequencies, the plurality of transmission signals each being obtained by demodulating a spectrum-spread spectrum spread signal; an analog-to-digital converter configured to discretize the plurality of intermediate frequency signals and output a plurality of discretization signals; a plurality of noise removing units configured to remove a noise other than a normal thermal noise included in the plurality of discretization signals from the plurality of discretization signals; and a controller configured to detect the noise included in the plurality of discretization signals and set assignment of the plurality of noise removing units to the plurality of discretization signals based on a detection result thereof.

According to an embodiment of the present disclosure, a plurality of transmission signals in different frequency bands are converted into a plurality of intermediate frequency signals having different intermediate frequencies, the plurality of transmission signals each being obtained by demodulating a spectrum-spread spectrum spread signal. The plurality of intermediate frequency signals are discretized and a plurality of discretization signals are output. Based on a detection result of a noise included in the plurality of discretization signals, assignment of the plurality of noise removing units to the plurality of discretization signals is set. A noise other than a normal thermal noise included in the plurality of discretization signals is removed from the plurality of discretization signals.

The reception apparatus may be an independent apparatus or internal blocks constituting a single apparatus.

According to the embodiment of the present disclosure, it is possible to suppress an increase in the circuit scale while reducing an external noise.

These and other objects, features and advantages of the present disclosure will become more apparent in light of the following detailed description of best mode embodiments thereof, as illustrated in the accompanying drawings.

DETAILED DESCRIPTION OF EMBODIMENTS

<Configuration Example of Reception Apparatus>

Figure 1:
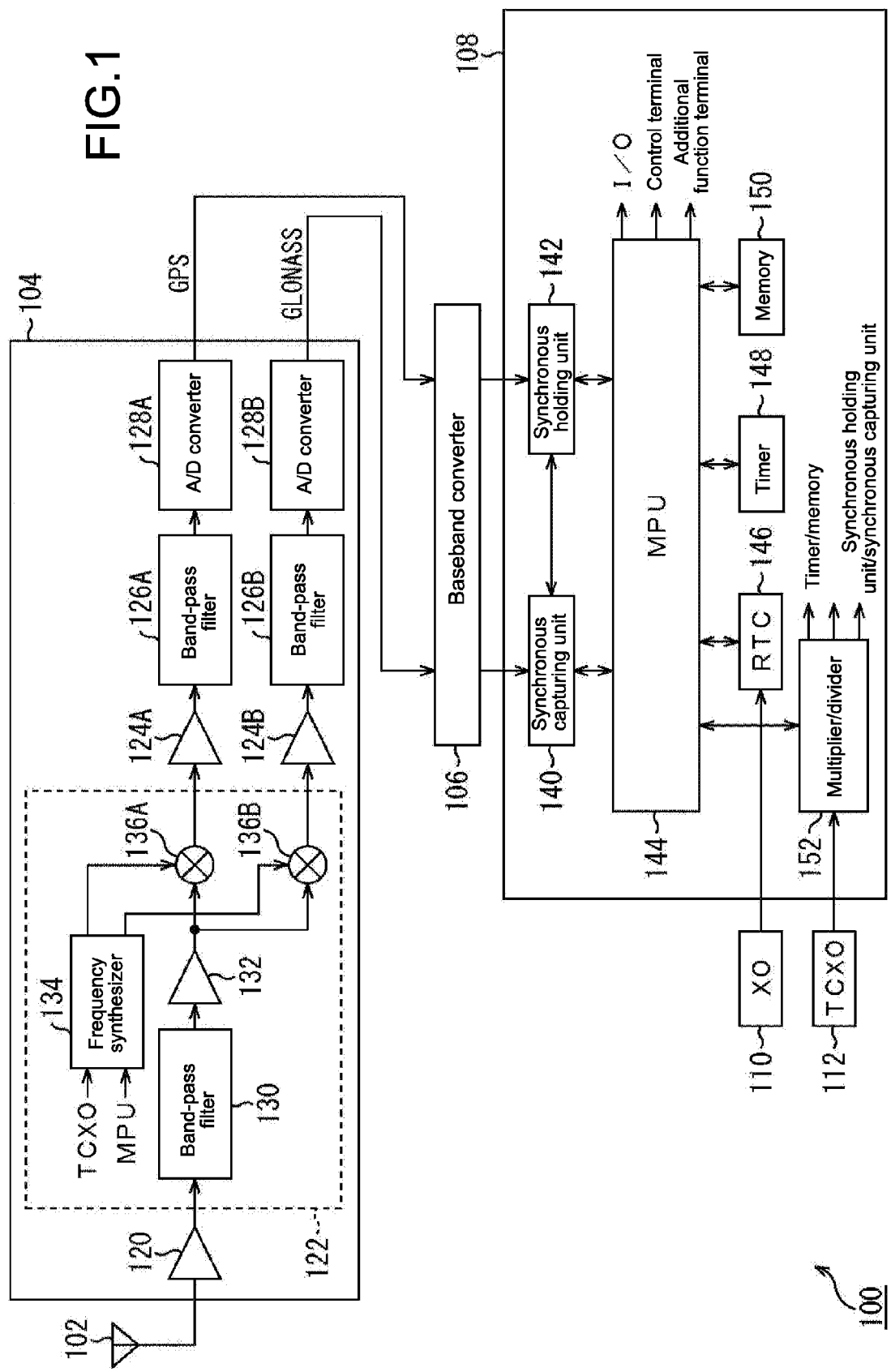
FIG. 1 is a block diagram showing a configuration example of an embodiment of the reception apparatus to which the present disclosure is applied.

FIG. 1 shows a configuration example of an embodiment of a reception apparatus to which the present disclosure is applied.

A reception apparatus 100 of FIG. 1 is an apparatus that receives transmission signals in different frequency bands, the transmission signals being transmitted from positioning satellites. In this embodiment, an example in which the reception apparatus 100 receives transmission signals transmitted from two positioning satellites of a global positioning system (GPS) satellite and a global orbiting navigation satellite system (GLONASS) satellite will be described. Of course, as will be described later, a configuration in which transmission signals other than transmission signals transmitted from the GPS satellite and the GLONASS satellite are received may be adopted.

Hereinafter, the transmission signal transmitted from the GPS satellite will be referred to as a GPS signal and the transmission signal transmitted from the GLONASS satellite will be referred to as a GLONASS signal. In some cases, the GPS signal and the GLONASS signal will be collectively referred to as radio frequency (RF) signals.

The GPS signal is a signal obtained by performing binary phase shift keying (BPSK) modulation on a carrier of 1575.42 MHz based on a spectrum spread signal obtained by subjecting data of 50 bps to a spectrum spread using a Gold code where a code length is 1023 and a chip rate is at 1.023 MHz. Therefore, the GPS signal is a signal having a frequency of from 1573.374 MHz to 1577.466 MHz.

In contrast, the GLONASS signal is a signal obtained by performing BPSK modulation on a carrier of 1602 MHz+p× 0.5625 MHz (p is frequency channel number of each satellite) based on a spectrum spread signal obtained by subjecting data of 50 bps to a spectrum spread using a Gold code where a code length is 511 and a chip rate is at 0.511 MHz. Therefore, the GLONASS signal is a signal having a frequency of from 1597.551 MHz to 1605.886 MHz.

The reception apparatus 100 includes a reception antenna 102, a frequency converter 104, a baseband converter 106, a demodulating unit 108, an X'tal oscillator (XO; crystal oscillator) 110, and a temperature compensated X'tal oscillator (TCXO; temperature compensated crystal oscillator) 112.

The reception antenna 102 receives RF signals transmitted from the GPS satellite and the GLONASS satellite and outputs the RF signals to the frequency converter 104.

The frequency converter 104 downconverts (converts) frequencies of the RF signals received by the reception antenna 102 into intermediate frequencies (IF) and converts the RF signals into IF signals (intermediate frequency signals). In addition, the frequency converter 104 discretizes the analog IF signals and outputs the resulting discretization signals to the baseband converter 106.

The GPS signal and the GLONASS signal are different in frequency band and multiplexing system, and hence the frequency converter 104 downconverts the frequencies into different intermediate frequencies of the GPS signal and the GLONASS signal. Therefore, the frequency converter 104 outputs a discretization signal obtained by discretizing the IF signal of the GPS signal and a discretization signal obtained by discretizing the IF signal of the GLONASS signal to the baseband converter 106. Note that the multiplexing system of the GPS signal is a code division multiple access (CDMA) and the multiplexing system of the GLONASS signal is a frequency division multiple access (FDMA).

The baseband converter 106 converts the discretization signal supplied from the frequency converter 104 into a baseband signal, and outputs the baseband signal to the demodulating unit 108. Note that, in this embodiment, as will be described later, the discretization signal obtained by discretizing the IF signal of the GLONASS signal using frequency-division multiplexing is output to the demodulating unit 108 as it is.

If the baseband signal includes an external noise, the baseband converter 106 has a noise removing function of removing the external noise. Here, the external noise is, for example, a narrowed noise or a noise having a single frequency. Examples of the external noise may include a noise generated by harmonics of a clock signal that drives a digital circuit, other narrowband radio interference, a power supply noise due to a switching regulator, or the like. However, the present disclosure is not limited thereto.

The demodulating unit 108 demodulates the baseband signal output from the baseband converter 106.

The XO 110 generates an oscillation signal having a predetermined oscillation frequency, for example, 32.768 kHz. Then, the XO 110 supplies the generated oscillation signal to the RTC 146 (to be described later) of the demodulating unit 108.

A TCXO 112 generates an oscillation signal having a frequency different from that of the oscillation signal generated by the XO 110, for example, 18.414 MHz. Then, the TCXO 112 supplies the generated oscillation signal to the multiplier/divider 152, the frequency synthesizer 134 (to be described later), and the like.

Next, a detailed configuration of the frequency converter 104 and the demodulating unit 108 will be described.

(Configuration Example of Frequency Converter 104)

First, a detailed configuration of the frequency converter 104 will be described.

The frequency converter 104 includes a low-noise amplifier (LNA) 120, an intermediate frequency converter 122, an amplifier 124, a band-pass filter (BPF) 126, and an A/D converter 128.

The intermediate frequency converter 122 converts the received RF signals into an IF$_{GPS}$ signal that is an IF signal of the GPS signal and into an IF$_{GLONASS}$ signal that is an IF signal of the GLONASS signal. Therefore, the amplifier 124, the BPF 126, and the A/D converter 128 are provided corresponding to the IF$_{GPS}$ signal and the IF$_{GLONASS}$ signal. That is, the frequency converter 104 includes an amplifier 124A that processes the IF$_{GPS}$ signal, BPFs 126A and 126B, an amplifier 124B that processes the IF$_{GLONASS}$ signal, and A/D converters 128A and 128B.

The LNA 120 amplifies the RF signals received by the reception antenna 102.

The intermediate frequency converter 122 downconverts, in order to easily perform digital signal processing, frequencies of the RF signals amplified by the LNA 120 into intermediate frequencies (IF) lower than a carrier frequency, for example, 4.092 MHz or 1.023 MHz.

Now, a configuration example of the intermediate frequency converter 122 will be described.

(Configuration Example of Intermediate Frequency Converter 122)

The intermediate frequency converter 122 includes a band-pass filter (BPF) 130, an amplifier 132, a frequency synthesizer 134, and mixers 136A and 136B.

The BPF 130 passes therethrough only signals in a particular frequency band and attenuates signals in other frequency bands out of the amplified RF signals output from the LNA 120.

The amplifier 132 amplifies the RF signals output from the BPF 130. Although the amplifier 132 may include, for example, a metal oxide semiconductor field effect transistor (MOSFET) differential amplifier, the amplifier 132 is not limited thereto.

Based on the oscillation signal supplied from the TCXO 112, the frequency synthesizer 134 generates local oscillation signals having a predetermined frequency. Although the frequency synthesizer 134 is controlled by, for example, an MPU 144 of the demodulating unit 108, the present disclosure is not limited thereto. The frequency synthesizer 134 may be controlled by a controller or the like of an external apparatus.

The mixers 136A and 136B multiplies the RF signals with the local oscillation signals output from the frequency synthesizer 134, to thereby output the IF signals downconverted into the intermediate frequencies (IF) lower than the carrier frequency depending on the local oscillation signal. More specifically, the mixer 136A multiplies the amplified RF signal output from the amplifier 132 with the local oscillation signal, to thereby output the IF $_{GPS}$ signal of the GPS signal. The mixer 136B multiplies the amplified RF signal output from the amplifier 132 with the local oscillation signal and outputs the IF $_{GLONASS}$ signal of the GLONASS signal.

The amplifier 124A amplifies the IF $_{GPS}$ signal output from the mixer 136A of the intermediate frequency converter 122. The amplifier 124B amplifies the IF $_{GLONASS}$ signal output from the mixer 136B of the intermediate frequency converter 122. Although the amplifiers 124A and 124B may include, for example, operational amplifiers, the amplifiers 124A and 124B are not limited thereto.

The BPF 126A passes therethrough only signals in a particular frequency band and attenuates signals in other frequency bands out of the amplified IF $_{GPS}$ signals output from the amplifier 124A. The BPF 126B passes therethrough only signals in a particular frequency band and attenuates signals in other frequency bands out of the amplified IF $_{GLONASS}$ signals output from the amplifier 124B. Note that, instead of the BPFs 126A and 126B, low-pass filters (LPF) that attenuate signals having a frequency higher than a cutoff frequency may be adopted. Here, the signals processed from the LNA 120 to the BPFs 126A and 126B are analog signals.

An A/D converter 128A discretizes the analog IF $_{GPS}$ signal output from the BPF 126A and outputs the resulting discretization signal. An A/D converter 128B discretizes the analog IF $_{GLONASS}$ signal output from the BPF 126B and outputs the resulting discretization signal. Here, the A/D converters 128A and 128B include A/D converters having an N-bit resolution. The average amplitude of a normal thermal noise is set as lower M-bits (N>M) of the A/D converter 128. Therefore, the A/D converters 128A and 128B prevent saturation of an output spectrum of the A/D converter due to the external noise and the external noise can be reliably removed by a notch filter unit 183 (FIG. 2) at the subsequent stage of the A/D converters 128A and 128B.

For example, with the above-mentioned configuration, the frequency converter 104 is capable of converting the RF signals received by the reception antenna 102 into the IF $_{GPS}$ signal and the IF $_{GLONASS}$ signal downconverted into the intermediate frequencies (IF), and outputting the discretization signals as digital signals.

(Configuration Example of Demodulating Unit 108)

Next, a detailed configuration of the demodulating unit 108 will be described.

The demodulating unit 108 detects a spectrum spread signal based on the baseband signal output by the baseband converter 106, and demodulates the detected spectrum spread signal. It should be noted that, in this embodiment, a signal having the intermediate frequency is output from the baseband converter 106 to the demodulating unit 108 without baseband conversion processing with respect to the IF $_{GLONASS}$ signal.

The demodulating unit 108 includes a synchronous capturing unit 140, a synchronous holding unit 142, a micro processing unit (MPU) 144, a real time clock (RTC) 146, a timer 148, a memory 150, and a multiplier/divider 152.

The synchronous capturing unit 140 performs synchronous capturing of a spread code in the baseband signal output by the baseband converter 106, under the control of the MPU 144, based on the multiplied and/or divided oscillation signal supplied from the multiplier/divider 152. With the synchronous capturing of the spread code, the synchronous capturing unit 140 detects apparatus identification information (e.g., satellite number for identifying GPS satellite) indicating the external apparatus as a transmission source. Then, the synchronous capturing unit 140 transmits a phase of the detected spread code, the apparatus identification information, and the like to the synchronous holding unit 142 and the MPU 144.

The synchronous capturing unit 140 may include, for example, a digital matched filter using a fast Fourier transform. Although, for example, a technique disclosed in Japanese Patent Application Laid-open No. 2003-232844 may be used for the digital matched filter, the present disclosure is not limited thereto.

The synchronous holding unit 142 synchronously holds the spread code in the baseband signal, based on the multiplied and/or divided oscillation signal supplied from the multiplier/divider 152 and various types of information (phase of spread code, apparatus identification information, and the like) transmitted from the synchronous capturing unit 140, under the control of the MPU 144. With the synchronous holding, the synchronous holding unit 142 demodulates data included in the baseband signal. Here, the synchronous holding unit 142 starts processing using the phase, the apparatus identification information, and the like of the spread code transmitted from the synchronous capturing unit 140 as initial values.

The synchronous holding unit 142 transmits the phase of the detected spread code and the demodulated data to the MPU 144. Note that the synchronous holding unit 142 is capable of synchronously holding the baseband signals corresponding to the transmission signals transmitted from a plurality of positioning satellites (external apparatuses), in parallel. Although, for example, a technique disclosed in Japanese Patent Application Laid-open No. 2003-232844 may be used for the synchronous holding unit 142, the present disclosure is not limited thereto.

The MPU 144 performs processing based on the phase and data of the spread code transmitted from the synchronous holding unit 142. For example, the MPU 144 calculates the position and speed of the reception apparatus 100, and performs various types of arithmetic processing to correct time information of the reception apparatus 100 based on time information of each positioning satellite resulting from the demodulated data.

The MPU 144 is also capable of performing a control of each unit of the reception apparatus 100, a control relating to input/output into/from the external apparatus, and the like. In other words, the MPU 144 is also capable of functioning as a controller of the entire reception apparatus 100.

The RTC 146 measures a time based on the oscillation signal supplied from the XO 110. The time information determined by the RTC 146 is, for example, used as a substitute until the time information of the GPS satellite is obtained. When the time information of the GPS satellite is obtained, the MPU 144 is appropriately corrected by controlling the timer 148.

The timer 148 is used for generating various timing signals for controlling operations of the units of the reception apparatus 100 in the MPU 144 and for referring to the time.

The memory 150 includes, for example, a read only memory (ROM) or a random access memory (RAM). In the ROM constituting the memory 150, control data such as a program and an operation parameter used by the MPU 144 is recorded. A program and the like executed by the MPU 144 is temporarily stored in the RAM.

The multiplier/divider 152 multiplies or divides the oscillation signal supplied from the TCXO 112.

For example, with the above-mentioned configuration, the demodulating unit 108 is capable of detecting and demodulating the spectrum spread signal based on the baseband signal output by the baseband converter 106.

As described above, the reception apparatus 100 is capable of receiving two kinds of transmission signals of the GPS signal and the GLONASS signal and detecting and demodulating the spectrum spread signals included in the received transmission signals.

<Configuration Example of Baseband Converter 106>

Next, referring to FIG. 2, a configuration of the baseband converter 106 will be described.

Figure 2:
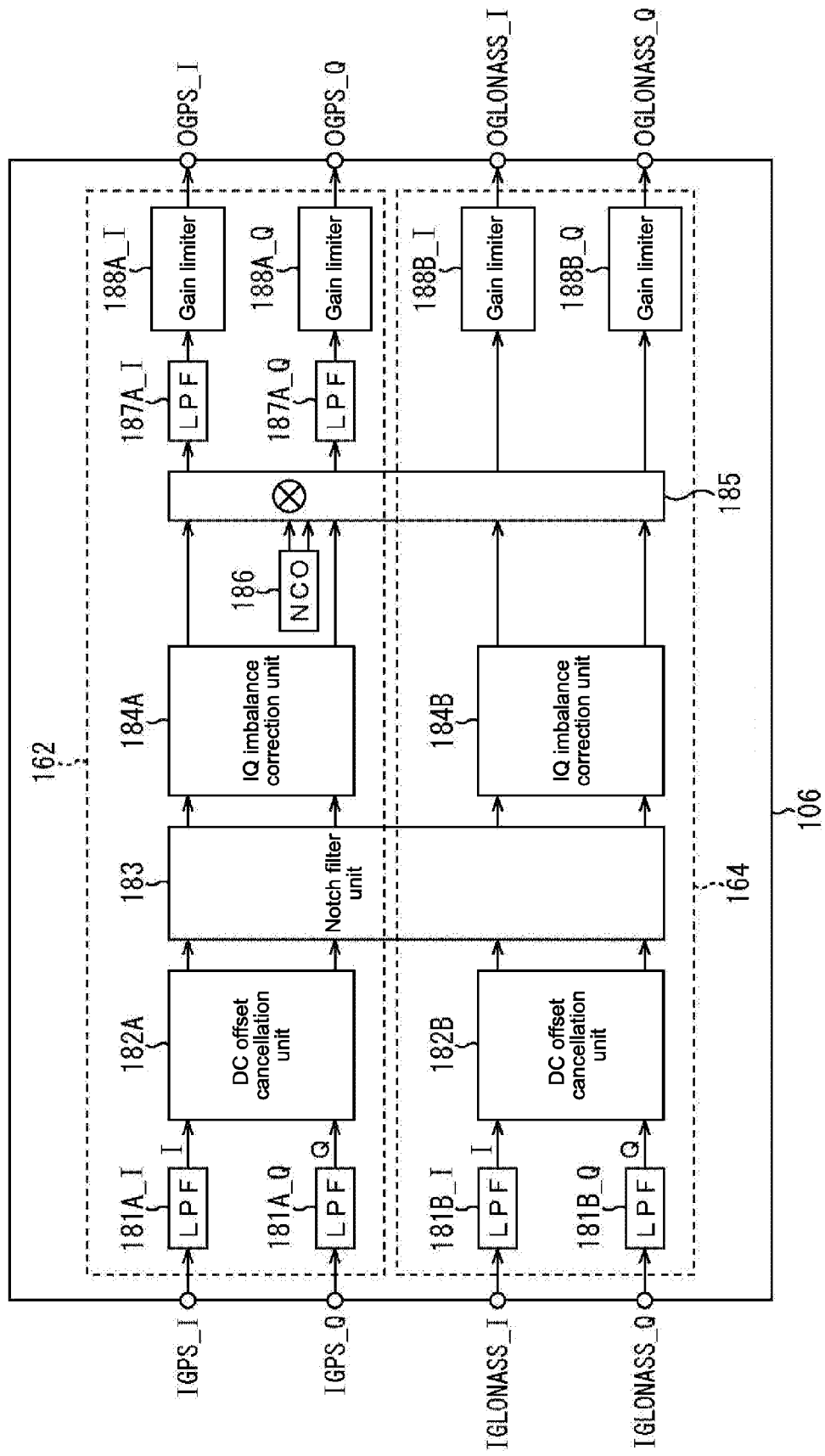
FIG. 2 is a block diagram showing a detailed configuration example of a baseband converter.

FIG. 2 is a block diagram showing a detailed configuration example of the baseband converter 106.

The baseband converter 106 includes a GPS converter 162 that processes the IF $_{GPS}$ signal output from the A/D converter 128A of the frequency converter 104 and a GLONASS converter 164 that processes the IF $_{GLONASS}$ signal output from the A/D converter 128B of the frequency converter 104. Therefore, the baseband converter 106 is also divided into signal paths of two systems of the GPS signal and the GLONASS signal.

The GPS converter 162 includes low-pass filters (LPF) 181A_I and 181A_Q, a DC offset cancellation unit 182A, the notch filter unit 183, an IQ imbalance correction unit 184A, a complex mixer 185, a numerically controlled oscillator (NCO) 186, LPFs 187A_I and 187A_Q, and gain limiters 188A_I and 188A_Q.

The GLONASS converter 164 includes LPFs 181B_I and 181B_Q, a DC offset cancellation unit 182B, the notch filter unit 183, an IQ imbalance correction unit 184B, the complex mixer 185, and gain limiters 188B_I and 188B_Q.

Therefore, the notch filter unit 183 and the complex mixer 185 are commonly provided in the GPS converter 162 and the GLONASS converter 164.

The LPF 181A_I attenuates, with respect to the IF $_{GPS}$ signal of an I-phase component (in-phase component) output from the A/D converter 128A, a signal having a frequency higher than the cutoff frequency, to thereby limit the signal to a necessary frequency band. The LPF 181A_Q attenuates, with respect to the IF $_{GPS}$ signal of a Q-phase component (quadrature-phase component) output from the A/D converter 128A, a signal having a frequency higher than the cutoff frequency, to thereby limit the signal to a necessary frequency band.

The LPF 181B_I attenuates, with respect to the IF $_{GLONASS}$ signal of an I-phase component output from the A/D converter 128B, a signal having a frequency higher than the cutoff frequency, to thereby limit the signal to a necessary frequency band. The LPF 181B_Q attenuates, with respect to the IF $_{GLONASS}$ signal of a Q-phase component output from the A/D converter 128B, a signal having a frequency higher than the cutoff frequency, to thereby limit the signal to a necessary frequency band.

The DC offset cancellation unit 182A cuts a direct-current (DC) component of the IF $_{GPS}$ signals of the I-phase component and the Q-phase component after the frequency band is limited and cancels a DC offset.

The DC offset cancellation unit 182B cuts a DC component of the IF $_{GLONASS}$ signals of the I-phase component and the Q-phase component after the frequency band is limited and cancels a DC offset.

The notch filter unit 183 removes an interfering wave as the external noise included in the IF $_{GPS}$ signal after the DC offset is cancelled. The notch filter unit 183 removes the interfering wave as the external noise included in the IF $_{GLONASS}$ signal after the DC offset is cancelled. Here, the external noise is a noise having a single frequency or a narrowband noise where a noise band is narrow.

Although will be described later in detail with reference to FIG. 3, the notch filter unit 183 includes a plurality of notch filters 241 (FIG. 3), and is capable of removing a plurality of interfering waves from each of the IF $_{GPS}$ signal and the IF $_{GLONASS}$ signal. The notch filter unit 183 assigns the plurality of notch filters 241 to either one of the IF $_{GPS}$ signal and the IF $_{GLONASS}$ signal depending on at least one of the number or level of interfering waves detected by each of the IF $_{GPS}$ signal and the IF $_{GLONASS}$ signal.

The IQ imbalance correction unit 184A corrects a mismatch in amplitude and phase between the I-phase component and the Q-phase component of the IF $_{GPS}$ signal. The IQ imbalance correction unit 184B corrects a mismatch in amplitude and phase between the I-phase component and the Q-phase component of the IF $_{GLONASS}$ signal. By correcting the mismatch in amplitude and phase between the I-phase component and the Q-phase component, an image rejection ratio can be increased. Note that, if sufficient properties are obtained in processing by the frequency converter 104, the IQ imbalance correction unit 184A and the IQ imbalance correction unit 184B may be omitted.

Regarding each of the I-phase component and the Q-phase component, the complex mixer 185 multiplies the intermediate frequency supplied from the NCO 186 with the IF $_{GPS}$ signal, to thereby convert the frequency of the IF $_{GPS}$ signal from the intermediate frequency (IF) into, for example, zero. That is, the complex mixer 185 converts the IF $_{GPS}$ signal into a BB $_{GPS}$ signal being a baseband signal. The NCO 186 generates, for example, an intermediate frequency of 4.092 MHz and supplies the intermediate frequency to the complex mixer 185.

Note that, regarding the GLONASS signal, the multiplexing system is frequency-division multiplexing, and hence frequency conversion in which the IF $_{GLONASS}$ signal is converted into each frequency band can be performed by the synchronous capturing unit 140 or the synchronous holding unit 142, and does not necessarily need to be performed by the baseband converter 106. Thus, in this embodiment, frequency conversion of the IF $_{GLONASS}$ signal is performed by the synchronous capturing unit 140 or the synchronous holding unit 142. Then, the complex mixer 185 outputs the IF $_{GLONASS}$ signal received from the IQ imbalance correction unit 184B, as it is.

The LPF 187A_I attenuates, with respect to the BB $_{GPS}$ signal of the base band of the I-phase component after frequency conversion, a signal having a frequency higher than the cutoff frequency, to thereby limit the signal to a predetermined frequency band. The LPF 187A_Q attenuates, with respect to the BB $_{GPS}$ signal of the base band of the Q-phase component after frequency conversion, a signal having a frequency higher than the cutoff frequency, to thereby limit the signal to a predetermined frequency band.

The gain limiter 188A_I adjusts and outputs the BB $_{GPS}$ signal of the baseband of the I-phase component output from the LPF 187A_I based on the number of input bits of the synchronous capturing unit 140 and the synchronous holding unit 142 at the subsequent stage.

The gain limiter 188A_Q adjusts and outputs the BB $_{GPS}$ signal of the baseband of the Q-phase component output from the LPF 187A_Q based on the number of input bits of the synchronous capturing unit 140 and the synchronous holding unit 142 at the subsequent stage.

The gain limiter 188B_I adjusts and outputs IF $_{GLONASS}$ signal of the I-phase component output from the complex mixer 185 based on the number of input bits of the synchronous capturing unit 140 and the synchronous holding unit 142 at the subsequent stage.

The gain limiter 188B_Q adjusts and outputs IF $_{GLONASS}$ signal of the Q-phase component output from the complex mixer 185 based on the number of input bits of the synchronous capturing unit 140 and the synchronous holding unit 142 at the subsequent stage.

<Detailed Configuration Example of Notch Filter Unit 183>

Figure 3:
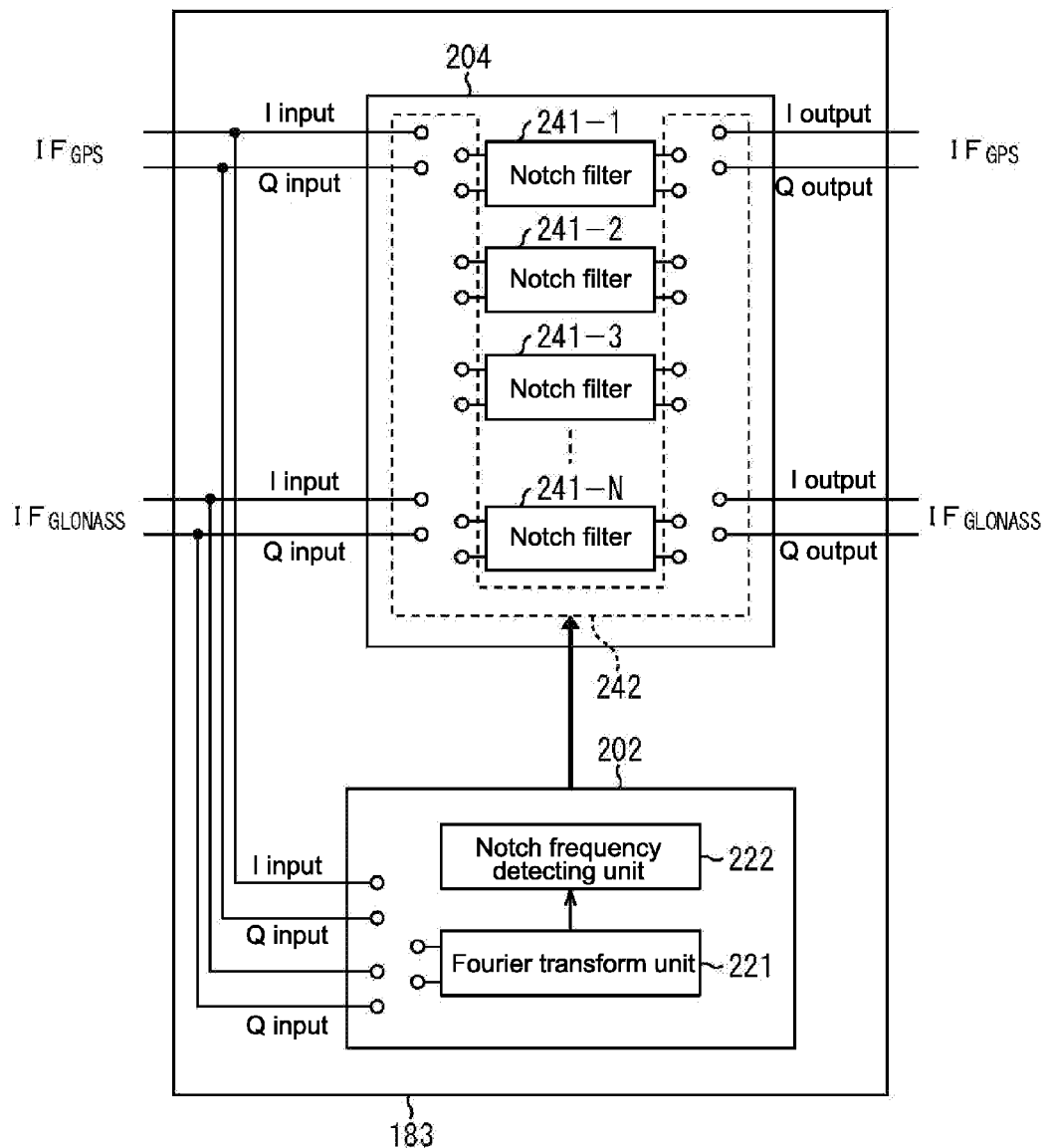
FIG. 3 is a block diagram showing a detailed configuration example of a notch filter unit.

FIG. 3 is a block diagram showing a detailed configuration of the notch filter unit 183.

The notch filter unit 183 includes a filter controller 202 and a filter processing unit 204. Then, the filter controller 202 includes a Fourier transform unit 221 (first Fourier transform unit) and a notch frequency detecting unit 222. On the other hand, the filter processing unit 204 includes an N-number of notch filters 241-1 to 241-N and a filter connecting unit 242. Note that, hereinafter, if the N-number of notch filters 241-1 to 241-N are not particularly distinguished, the N-number of notch filters 241-1 to 241-N will be simply referred to as notch filters 241. The notch filters 241 function as noise removing units.

The IF $_{GPS}$ signals of the I-phase component and the Q-phase component output from the DC offset cancellation unit 182A and the IF $_{GLONASS}$ signals of the I-phase component and the Q-phase component output from the DC offset cancellation unit 182B are selectively input into the Fourier transform unit 221.

The Fourier transform unit 221 performs a fast Fourier transform (FFT) on each of the IF $_{GPS}$ signal and the IF $_{GLONASS}$ signal. Then, the Fourier transform unit 221 transmits a result of the fast Fourier transform to the notch frequency detecting unit 222.

Although the Fourier transform unit 221 may include a dedicated fast Fourier transform circuit, the present disclosure is not limited thereto. For example, the Fourier transform unit 221 is also capable of using (sharing) the fast Fourier transform circuit used for performing despread processing in the demodulating unit 108.

The notch frequency detecting unit 222 detects, in the IF $_{GPS}$ signal and the IF $_{GLONASS}$ signal, a frequency of the interfering wave to be removed.

Specifically, based on the result of the fast Fourier transform that is transmitted from the Fourier transform unit 221, the notch frequency detecting unit 222 detects, in the IF $_{GPS}$ signal, a frequency f0 to be a peak at which the magnitude (level) of the amplitude is equal to or greater than a predetermined value, as a notch frequency. Based on the result of the fast Fourier transform that is transmitted from the Fourier transform unit 221, the notch frequency detecting unit 222 detects, in the IF $_{GLONASS}$ signal, a frequency f0' to be a peak at which the magnitude of the amplitude is equal to or greater than a predetermined value, as the notch frequency.

Note that, if a plurality of notch frequencies f0 are detected in the IF $_{GPS}$ signal, the plurality of notch frequencies f0 are denoted by f0_1, f0_2, f0_3, . . . in the order of the plurality of notch frequencies having large amplitude. Similarly, if a plurality of notch frequencies f0' are detected in the IF $_{GLONASS}$ signal, the plurality of notch frequencies f0' are referred to as a plurality of notch frequencies f0'_1, f0'_2, f0'_2, . . . in the order of the plurality of notch frequencies having large amplitude.

Although the notch frequency detecting unit 222 may include, for example, a peak detecting circuit including an operational amplifier, a diode, a capacitor, and the like, the present disclosure is not limited thereto. For example, the notch frequency detecting unit 222 may use a digital signal processing circuit that searches for a peak as the peak detecting circuit.

The filter controller 202 assigns, based on the detection result of the notch frequency detecting unit 222, a plurality of notch filters 241 of the filter processing unit 204 to the IF $_{GPS}$ signal or the IF $_{GLONASS}$ signal.

Specifically, the filter controller 202 sets one or more detected notch frequencies f0 or f0' in the notch filter 241 and controls connection of each notch filter 241.

Each notch filter 241 of the filter processing unit 204 removes the external noise from the IF $_{GPS}$ signal or the IF $_{GLONASS}$ signal by providing the set notch frequencies f0 or f0' with steep attenuation. The notch filter 241 is suitable for mainly removing a noise having a single frequency or a narrowband noise.

The filter connecting unit 242 of the filter processing unit 204 changes, according to a control of the filter controller 202, a setting of an input destination and an output destination of each notch filter 241. For example, the filter connecting unit 242 may connect all the notch filters 241 such that filter processing is performed on the IF $_{GPS}$ signal output from the DC offset cancellation unit 182A, and also connect all the notch filters 241 such that filter processing is performed on the IF $_{GLONASS}$ signal output from the DC offset cancellation unit 182B.

<Connection Examples of Notch Filter 241>

Referring to FIGS. 4 to 7, connection examples of the notch filter 241 by the filter controller 202 will be described. Note that, in FIGS. 4 to 7, the filter processing unit 204 includes four notch filters 241-1 to 241-4.

Figure 4:
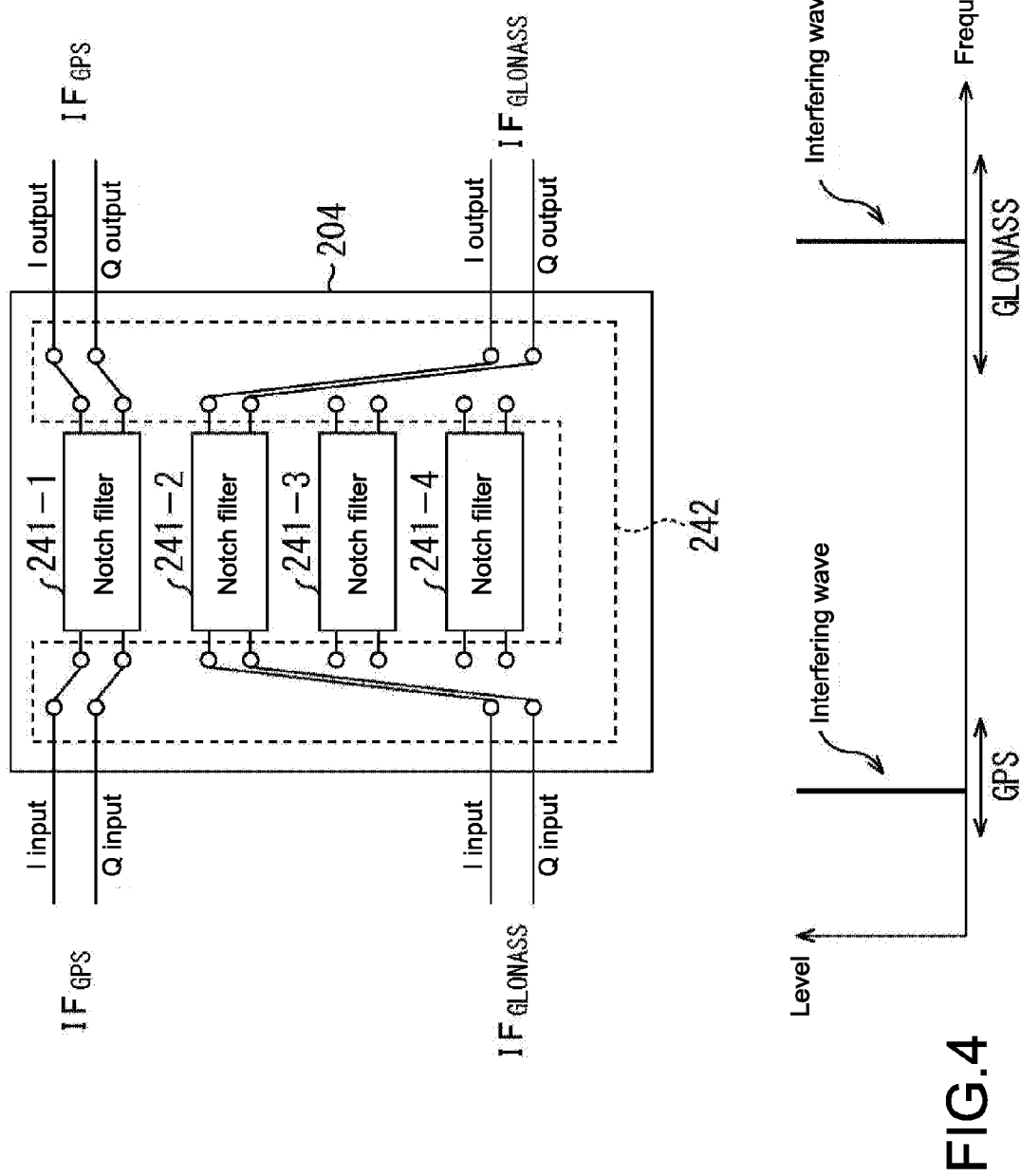
FIG. 4 is a diagram showing a connection example of a notch filter.

FIG. 4 shows a connection example when one interfering wave is detected in each of the IF $_{GPS}$ signal and the IF $_{GLONASS}$ signal by the notch frequency detecting unit 222.

In this case, the filter controller 202 assigns one of the four notch filters 241, for example, the notch filter 241-1 to the IF $_{GPS}$ signal and another one, for example, the notch filter 241-2 to the IF $_{GLONASS}$ signal.

That is, the filter controller 202 controls the filter connecting unit 242 such that the IF $_{GPS}$ signal from the DC offset cancellation unit 182A is input into the notch filter 241-1 and the IF $_{GPS}$ signal after the filter processing is output to the subsequent stage. Further, the filter controller 202 controls the filter connecting unit 242 such that the IF $_{GLONASS}$ signal from the DC offset cancellation unit 182B is input into the notch filter 241-2 and the IF $_{GLONASS}$ signal after the filter processing is output to the subsequent stage.

Figure 5:
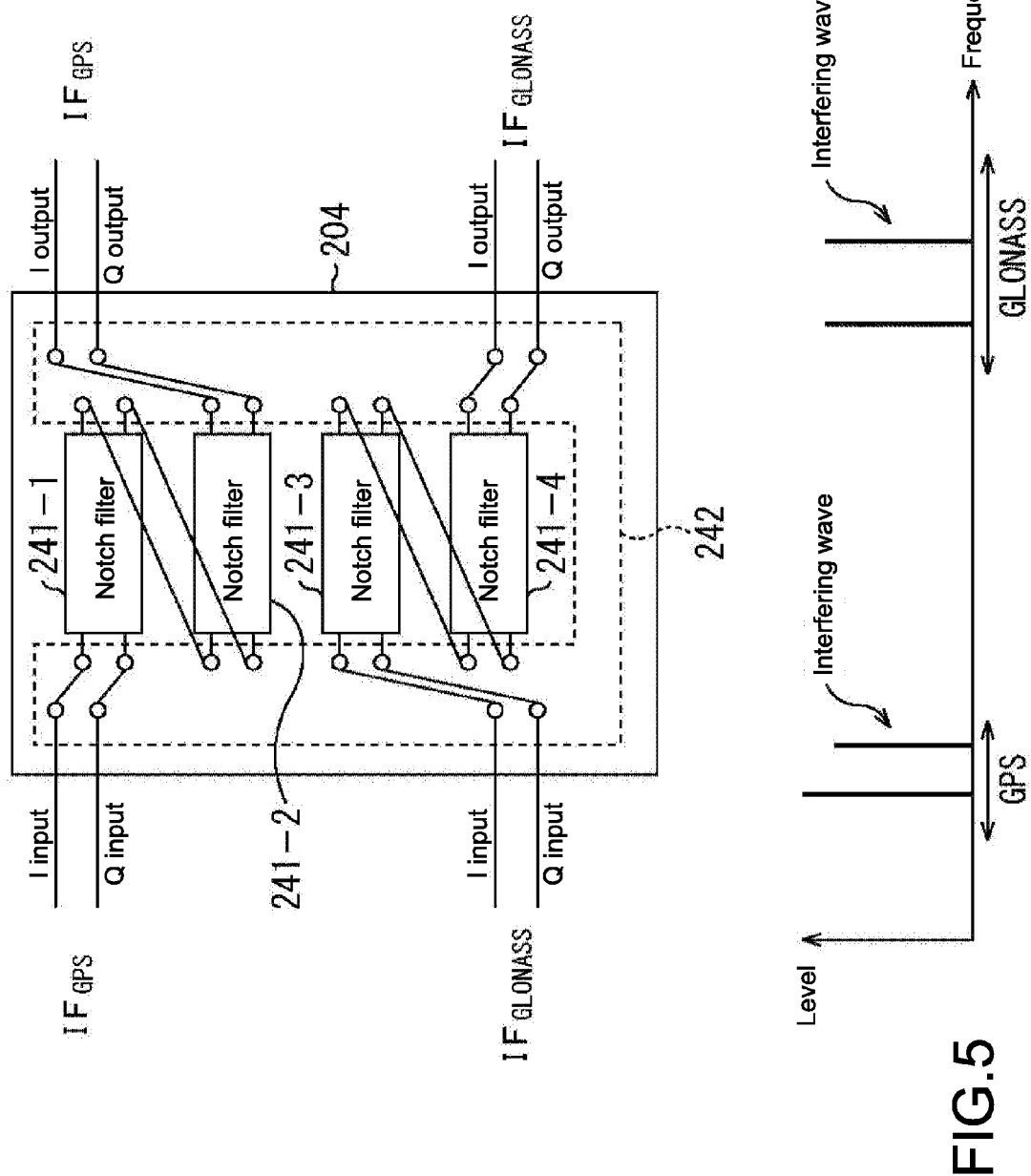
FIG. 5 is a diagram showing a connection example of the notch filter.

FIG. 5 shows a connection example when two interfering waves are detected in each of the IF $_{GPS}$ signal and the IF $_{GLONASS}$ signal by the notch frequency detecting unit 222.

In this case, the filter controller 202 assigns two of the four notch filters 241, for example, the notch filters 241-1 and 241-2 to the IF $_{GPS}$ signal, and assigns other two, for example, the notch filters 241-3 and 241-4 to the IF $_{GLONASS}$ signal.

That is, the filter controller 202 controls the filter connecting unit 242 such that the IF $_{GPS}$ signal from the DC offset cancellation unit 182A is input into the notch filter 241-1 and the notch filter 241-2 in the stated order and the IF $_{GPS}$ signal after the filter processing is output from the notch filter 241-2 to the subsequent stage. Further, the filter controller 202 controls the filter connecting unit 242 such that the IF $_{GLONASS}$ signal from the DC offset cancellation unit 182B is input into the notch filter 241-3 and the notch filter 241-4 in the stated order and the IF $_{GLONASS}$ signal after the filter processing is output from the notch filter 241-4 to the subsequent stage.

Figure 6:
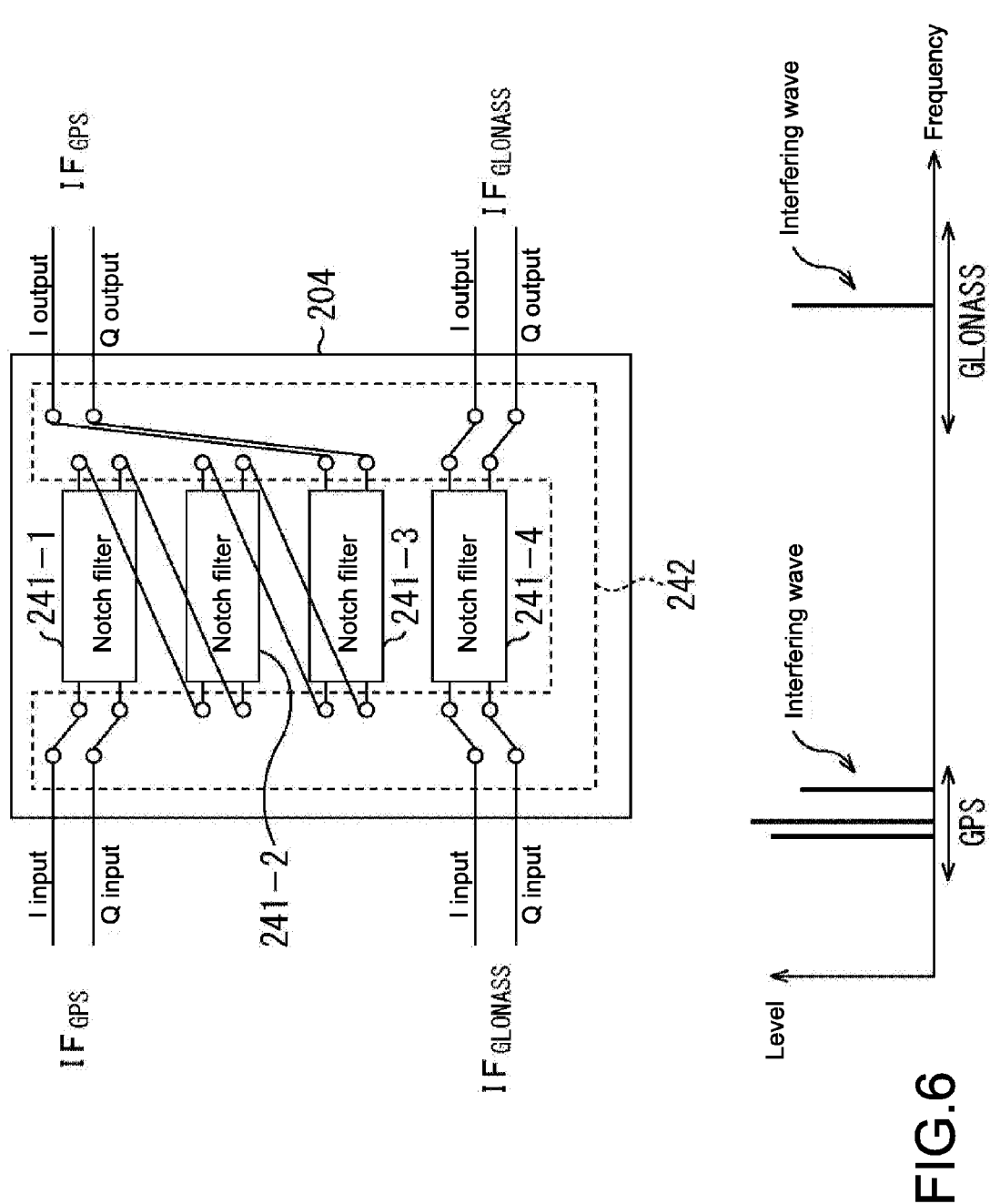
FIG. 6 is a diagram showing a connection example of the notch filter.

FIG. 6 shows a connection example when three interfering waves are detected in the IF $_{GPS}$ signal and one interfering wave is detected in the IF $_{GLONASS}$ signal by the notch frequency detecting unit 222.

In this case, the filter controller 202 assigns three of the four notch filters 241, for example, the notch filters 241-1 to 241-3 to the IF $_{GPS}$ signal and another one, for example, the notch filter 241-4 to the IF $_{GLONASS}$ signal.

That is, the filter controller 202 controls the filter connecting unit 242 such that the IF $_{GPS}$ signal from the DC offset cancellation unit 182A is input into the notch filter 241-1, the notch filter 241-2, and the notch filter 241-3 in the state order and the IF $_{GPS}$ signal after the filter processing is output from the notch filter 241-3 to the subsequent stage. Further, the filter controller 202 controls the filter connecting unit 242 such that the IF $_{GLONASS}$ signal from the DC offset cancellation unit 182B is input into the notch filter 241-4 and the IF $_{GLONASS}$ signal after the filter processing is output from the notch filter 241-4 to the subsequent stage.

Figure 7:
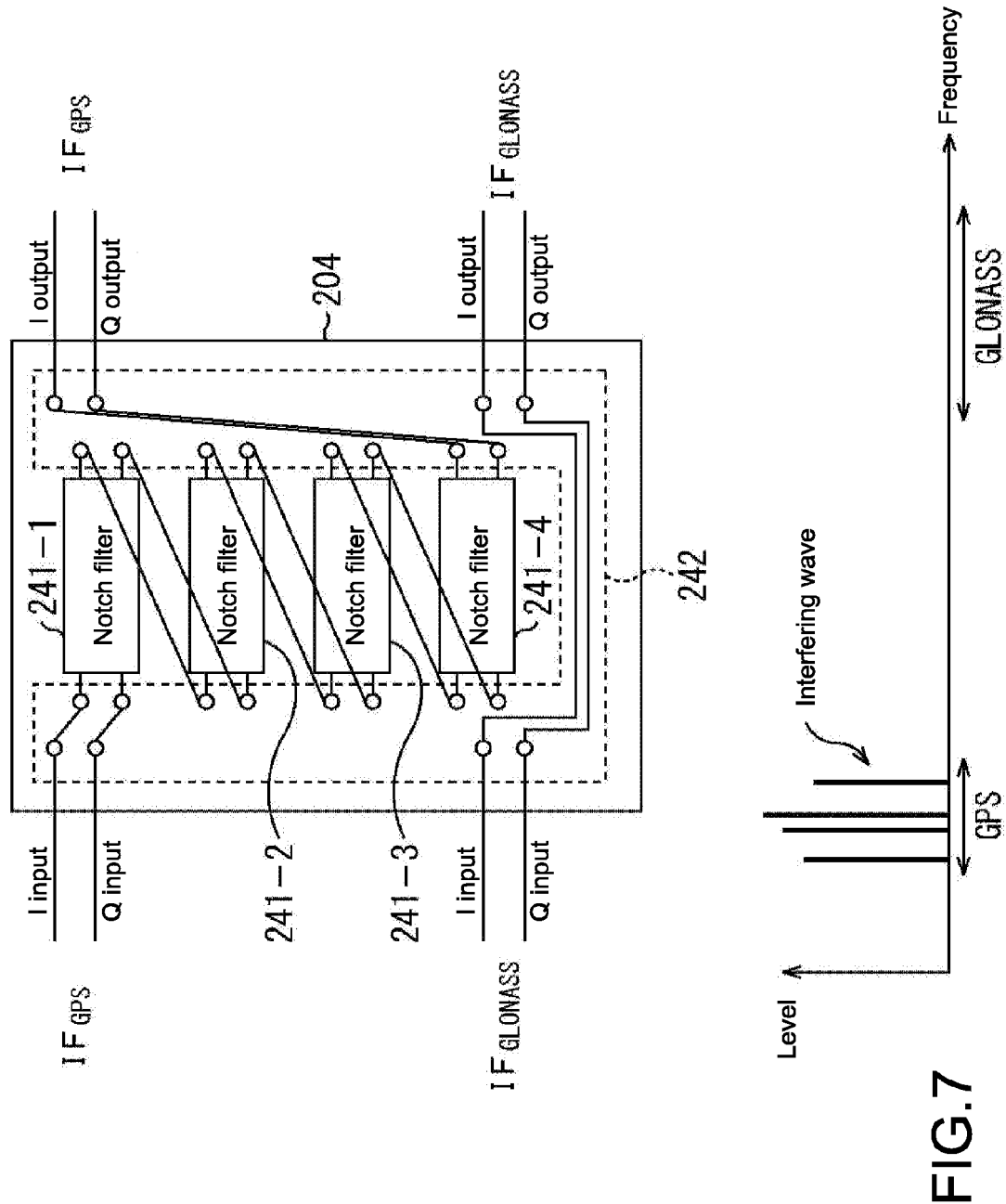
FIG. 7 is a diagram showing a connection example of the notch filter.

FIG. 7 shows a connection example when four interfering waves are detected in the IF $_{GPS}$ signal and no interfering waves are detected in IF $_{GLONASS}$ signal by the notch frequency detecting unit 222.

In this case, the filter controller 202 assigns all the notch filters 241-1 to 241-4 to the IF $_{GPS}$ signal.

That is, the filter controller 202 controls the filter connecting unit 242 such that the IF $_{GPS}$ signal from the DC offset cancellation unit 182A is input into the notch filter 241-1, the notch filter 241-2, the notch filter 241-3, and the notch filter 241-4 in the stated order and the IF $_{GPS}$ signal after the filter processing is output from the notch filter 241-4 to the subsequent stage. Further, the filter controller 202 controls the filter connecting unit 242 such that the IF $_{GLONASS}$ signal from the DC offset cancellation unit 182B is output to the subsequent stage as it is.

Note that, in the example shown in FIGS. 4 to 7, a total sum of the number of notch frequencies f0 and f0' detected by the notch frequency detecting unit 222 is equal to or smaller than the number of notch filters 241 (four) of the filter processing unit 204.

However, there can be a case where the number of notch frequencies f0 and f0' detected by the notch frequency detecting unit 222 is larger than the number of notch filters 241 of the filter processing unit 204. In such a case, the filter controller 202 assigns the notch filters 241 to the detected notch frequencies f0 and f0' in the order of the notch frequencies having large amplitude. In other words, the filter controller 202 assigns the plurality of notch filters 241 such that a noise having larger amplitude is preferentially removed.

<Detailed Configuration Example of Notch Filter 241>

Figure 8:
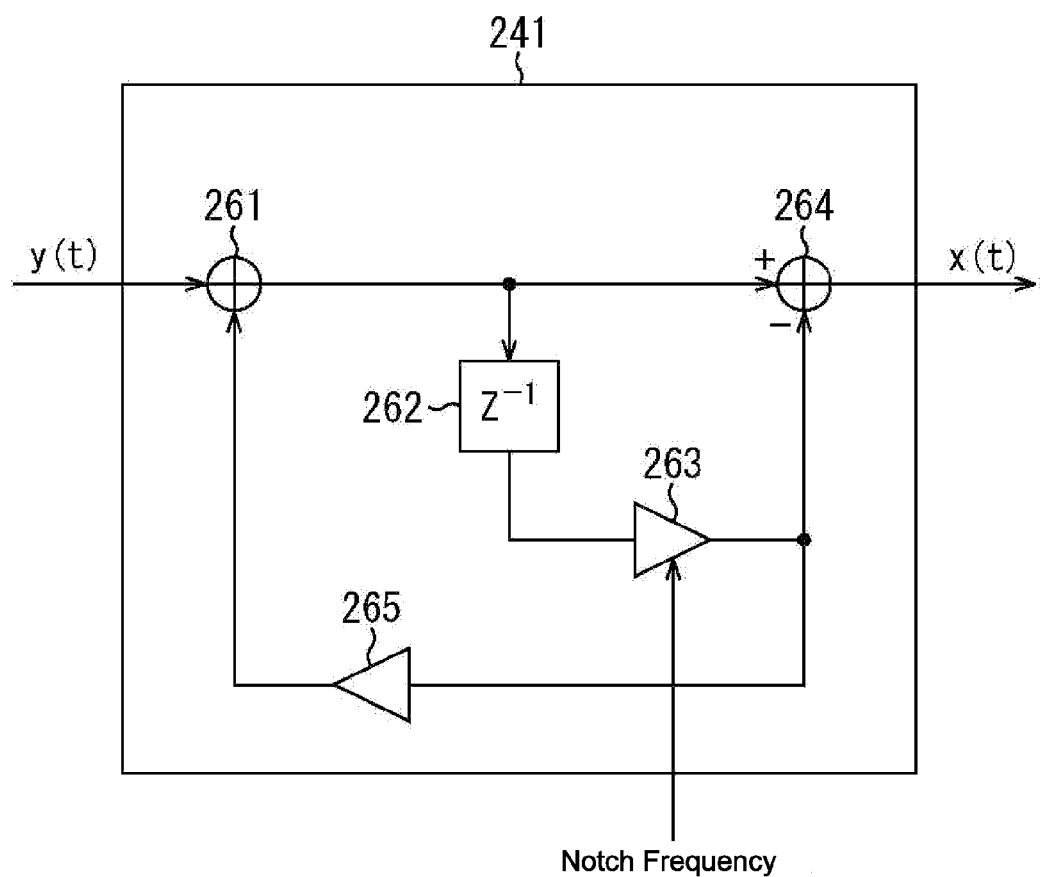
FIG. 8 is a block diagram showing a detailed configuration example of a notch filter unit.

FIG. 8 is a block diagram showing a detailed configuration of the notch filter 241.

In FIG. 8, the discretization signal (IF $_{GPS}$ signal or IF $_{GLONASS}$ signal) that can include the external noise, which is an input signal input into the notch filter 241, is indicated by a discretization signal y(t) and the discretization signal after the noise is removed is indicated by a discretization signal x(t).

The notch filter 241 includes a first adder 261, a delay element 262, a first multiplier 263, a second adder 264, and a second multiplier 265.

The first adder 261 adds the discretization signal y(t) input into the notch filter 241 and a feed back signal output from the second multiplier 265 and outputs a first addition signal.

The delay element 262 outputs a delay signal obtained by delaying the first addition signal output from the first adder 261 by one cycle (one clock) of a sampling period.

Based on the delay signal output from the delay element 262, the first multiplier 263 performs operations shown in Expression (1) below and outputs a multiplication signal.

$$Dout1 = Din1 \times e^{j*2\pi*f0*Ts} \quad (1)$$

In Expression (1), "Dout1" indicates the multiplication signal and "Din1" indicates the delay signal input into the first multiplier 263. Further, "f0" indicates the notch frequency set by the filter controller 202 and "Ts" indicates the sampling period. Note that, if the notch filter 241 is assigned to the IF $_{GLONASS}$ signal, the notch frequency f0 of Expression (1) becomes the notch frequency f0'.

The second adder 264 subtracts the multiplication signal from the first addition signal. Here, the multiplication signal is a signal component corresponding to the notch frequency, and hence the second adder 264 is capable of providing the notch frequency f0 with steep attenuation by subtracting the multiplication signal from the first addition signal. Therefore, the discretization signal x(t), from which the external noise corresponding to the notch frequency f0 has been removed, is output from the second adder 264.

Based on the multiplication signal output from the first multiplier 263, the second multiplier 265 performs an operation shown in Expression (2) below and outputs the feed back signal.

$$Dout2 = Din2 \times r \quad (2)$$

In Expression (2), "Dout2" indicates the feed back signal and "Din2" indicates a multiplication signal input into the second multiplier 265. Further, in Expression (2), "r" indicates a feedback coefficient, and the feedback coefficient r takes a value smaller than 1 (r>1). As the feedback coefficient r takes a value closer to 1, a notch band becomes smaller. Note that the feedback coefficient r may be a fixed coefficient set in advance or may be changed by, for example, the filter controller 202 depending on needs.

With the configuration shown in FIG. 8, the notch filter 241 is capable of outputting the discretization signal x(t), from which the external noise corresponding to the notch frequency f0 or f0' set by the filter controller 202 has been removed.

<Processing Flow of Noise Removing Processing>

Next, referring to the flowchart of FIG. 9, the noise removing processing by the notch filter unit 183 will be described.

First, in Step S1, the Fourier transform unit 221 performs a fast Fourier transform on the IF $_{GPS}$ signal output from the DC offset cancellation unit 182A and transmits a result thereof to the notch frequency detecting unit 222.

In Step S2, the Fourier transform unit 221 changes an input signal into the IF $_{GLONASS}$ signal output from the DC offset cancellation unit 182B. Then, the Fourier transform unit 221 performs a fast Fourier transform on the IF $_{GLONASS}$ signal and transmits a result thereof to the notch frequency detecting unit 222.

In Step S3, based on the result of the fast Fourier transform transmitted from the Fourier transform unit 221, the notch frequency detecting unit 222 detects the notch frequency f0 in the IF $_{GPS}$ signal and the notch frequency f0' in the IF $_{GLONASS}$ signal.

Note that, if a sum of the number of notch frequencies f0_1, f0_2, . . . , detected in the IF $_{GPS}$ signal and the number of the notch frequencies f0'_1, f0'_2, . . . , detected in the IF $_{GLONASS}$ signal is larger than the number of notch filters 241 of the filter processing unit 204, an N-number of notch frequencies f0 or f0' are selected in the order of the notch frequencies having large amplitude.

In Step S4, based on the detection result of the notch frequency detecting unit 222, the filter controller 202 sets the notch frequency f0 or the notch frequency f0' to each notch filter 241.

Then, in Step S5, the filter controller 202 controls connection of each notch filter 241 in the filter connecting unit 242. With this, the filter connecting unit 242 changes a setting of an input destination and an output destination of each notch filter 241. Note that, as described with reference to FIGS. 4 to 7, if the plurality of notch filters 241 are assigned to the same IF signal, the notch filters 241 thereof are connected in series.

In Step S6, the notch filter 241 of the filter processing unit 204 outputs the IF $_{GPS}$ signal in which a frequency component of the notch frequency f0 has been attenuated and the IF $_{GLONASS}$ signal in which a frequency component of the notch frequency f0' has been attenuated.

The noise removing processing executed by, for example, the above-mentioned procedure. Note that the connection control of the notch filter 241 based on the detection of the notch frequencies f0 and f0' and the detection result is continuously executed by the filter controller 202 while the IF $_{GPS}$ signal and the IF $_{GLONASS}$ signal are input. Then, if the detected notch frequency f0 or f0' or the number thereof is changed, the setting of the notch frequencies f0 and f0' and the connection of the notch filter 241 are also changed depending on the change.

<Other Configuration Examples of Notch Filter Unit 183>

Figure 10:
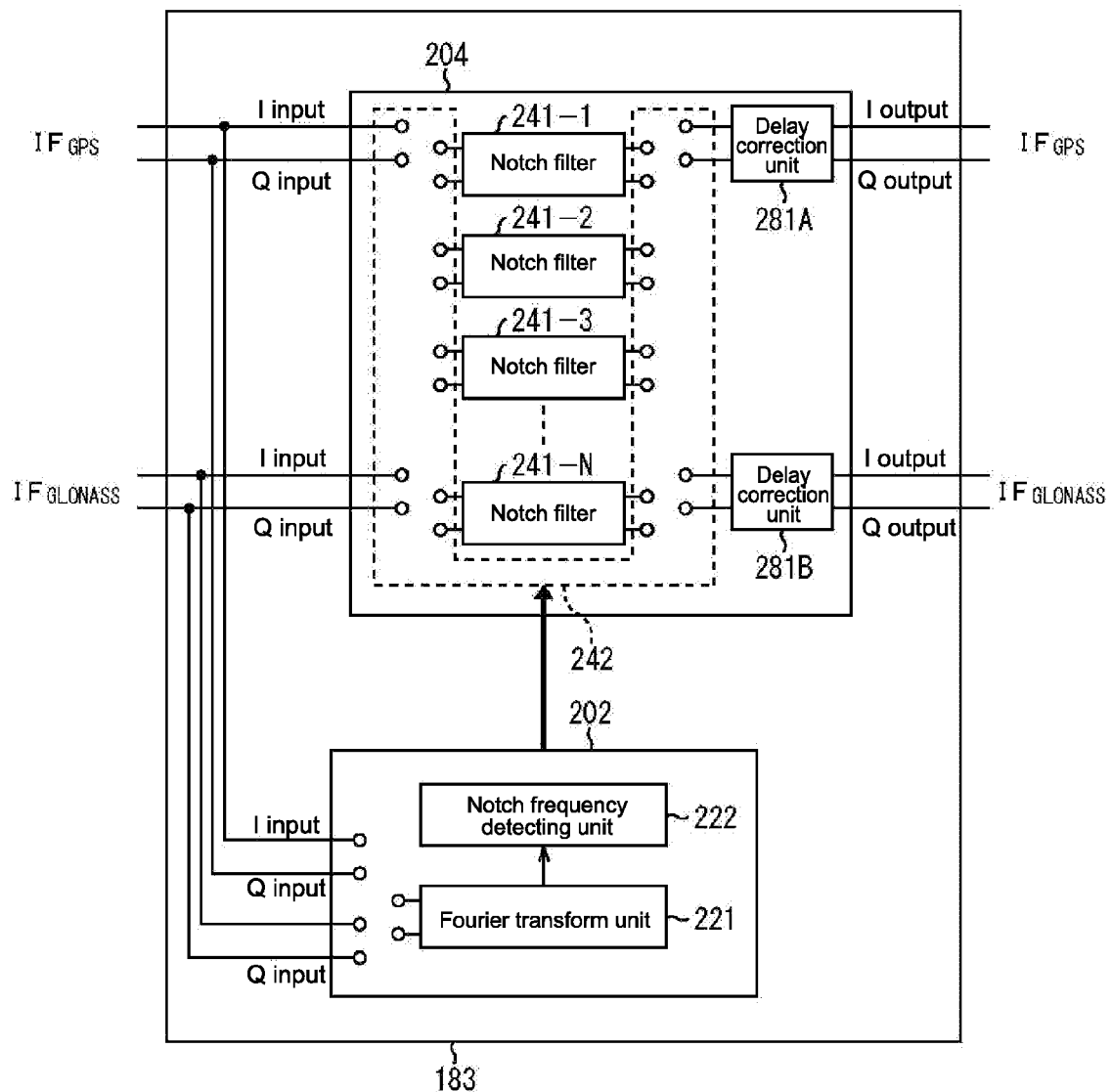
FIG. 10 is a block diagram showing another configuration example of the notch filter unit.

FIG. 10 shows other configuration examples of the notch filter unit 183.

Note that, in FIG. 10, portions corresponding to the components shown in FIG. 3 are denoted by the same reference symbols and a description thereof will be appropriately omitted.

The notch filter unit 183 in FIG. 10 is different in the configuration from the notch filter unit 183 in FIG. 3 in that delay correction units 281A and 281B are newly added to the notch filter unit 183.

The delay correction unit 281A corrects a delay time such that a timing at which the IF $_{GPS}$ signal is output to the IQ imbalance correction unit 184A at the subsequent stage is not changed due to the number of notch filters 241 applied to the IF $_{GPS}$ signal. Here, the delay time means a time from input to output of the IF $_{GPS}$ signal into/from the delay correction unit 281A. The delay time is specified by the filter controller 202 based on an assignment result of the notch filters 241.

For example, a time necessary for one notch filter 241 performing filter processing (noise removing processing) and outputting an input signal is denoted by Tz. In this case, the delay correction unit 281A holds the input IF $_{GPS}$ signal for a predetermined period and outputs the IF $_{GPS}$ signal such that a time from input to output of the IF $_{GPS}$ signal into/from the notch filter unit 183 becomes an N×Tz time.

For example, if the number of notch filters 241 is four (N=4) and the number of notch filters 241 assigned to the IF $_{GPS}$ signal by the filter controller 202 is one as in the above-mentioned example, the delay correction unit 281A delays an output timing of the input IF $_{GPS}$ signal by a 3×Tz time and outputs the input IF $_{GPS}$ signal.

Further, for example, if the number of notch filters 241 assigned to the IF $_{GPS}$ signal by the filter controller 202 is 4, the delay correction unit 281A immediately outputs the input IF $_{GPS}$ signal.

The delay correction unit 281B corrects the delay time such that a timing for outputting the IQ imbalance correction unit 184B at the subsequent stage is not changed due to the number of notch filters 241 applied to the IF $_{GLONASS}$ signal. The delay time is specified by the filter controller 202 based on an assignment result of the notch filter 241.

As described above, in this example, the total number of notch filters 241 is four (N=4). For example, if the number of notch filters 241 assigned to the IF $_{GLONASS}$ signal by the filter controller 202 is two, the delay correction unit 281B delays an output timing of the input IF $_{GLONASS}$ signal by a 2×Tz time and outputs the IF $_{GLONASS}$ signal. Otherwise, for example, if the number of notch filters 241 assigned to the IF $_{GLONASS}$ signal by the filter controller 202 is zero, the delay correction unit 281B delays an output timing of an input IF $_{GLONASS}$ signal by a 4×Tz time and outputs the IF $_{GLONASS}$ signal.

Figure 9:
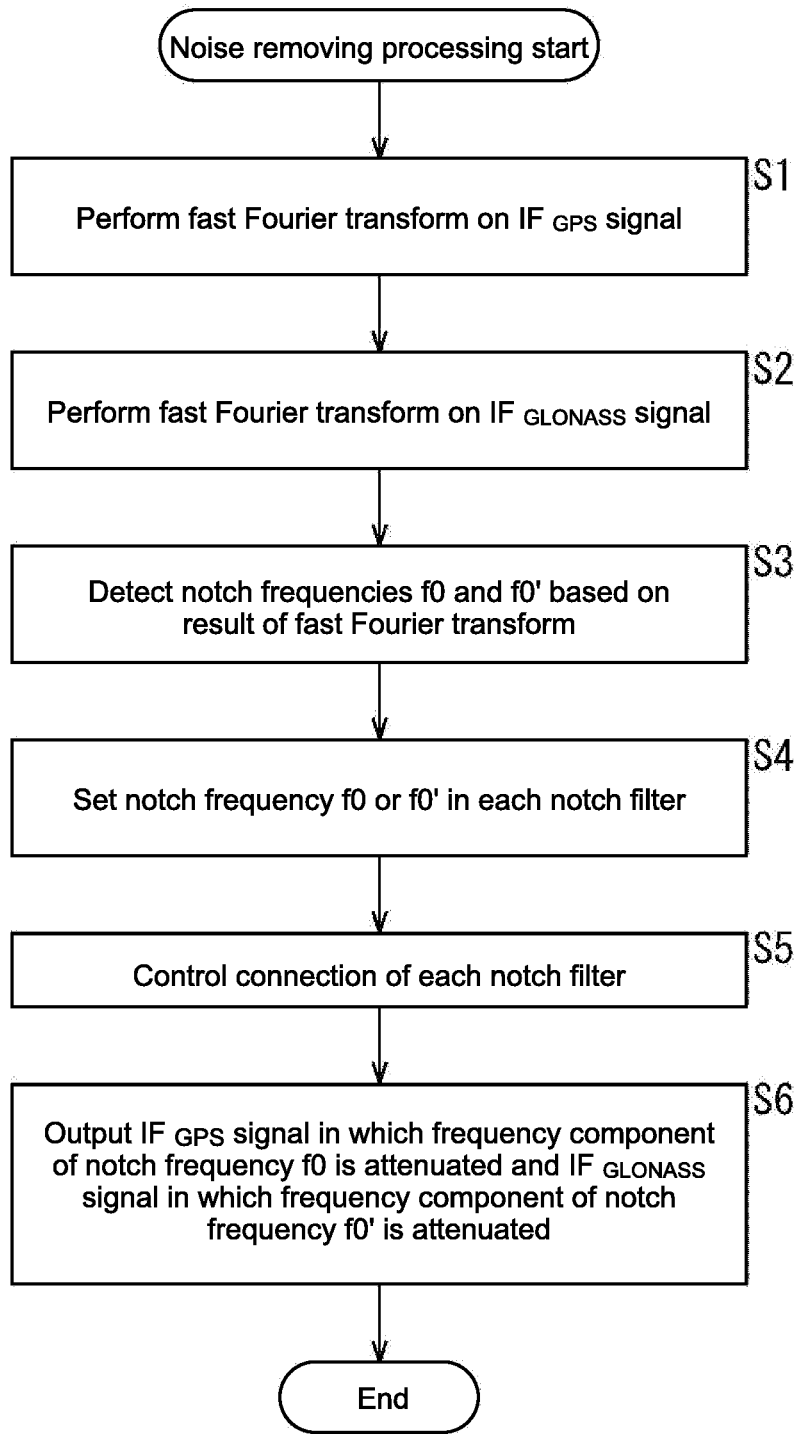
FIG. 9 is a flowchart for describing noise removing processing performed by the notch filter unit.

Noise processing performed by the notch filter unit 183 having the configuration shown in FIG. 10 can be realized by the delay correction units 281A and 281B performing the delay processing as subsequent processing of Step S5 of the noise removing processing shown in FIG. 9. With this, even if the notch filter unit 183 changes assignment of the notch filters 241, synchronization of the processing unit at the subsequent stage is not affected. Thus, a stable operation can be performed.

<Still Another Configuration Example of Notch Filter Unit 183>

Figure 11:
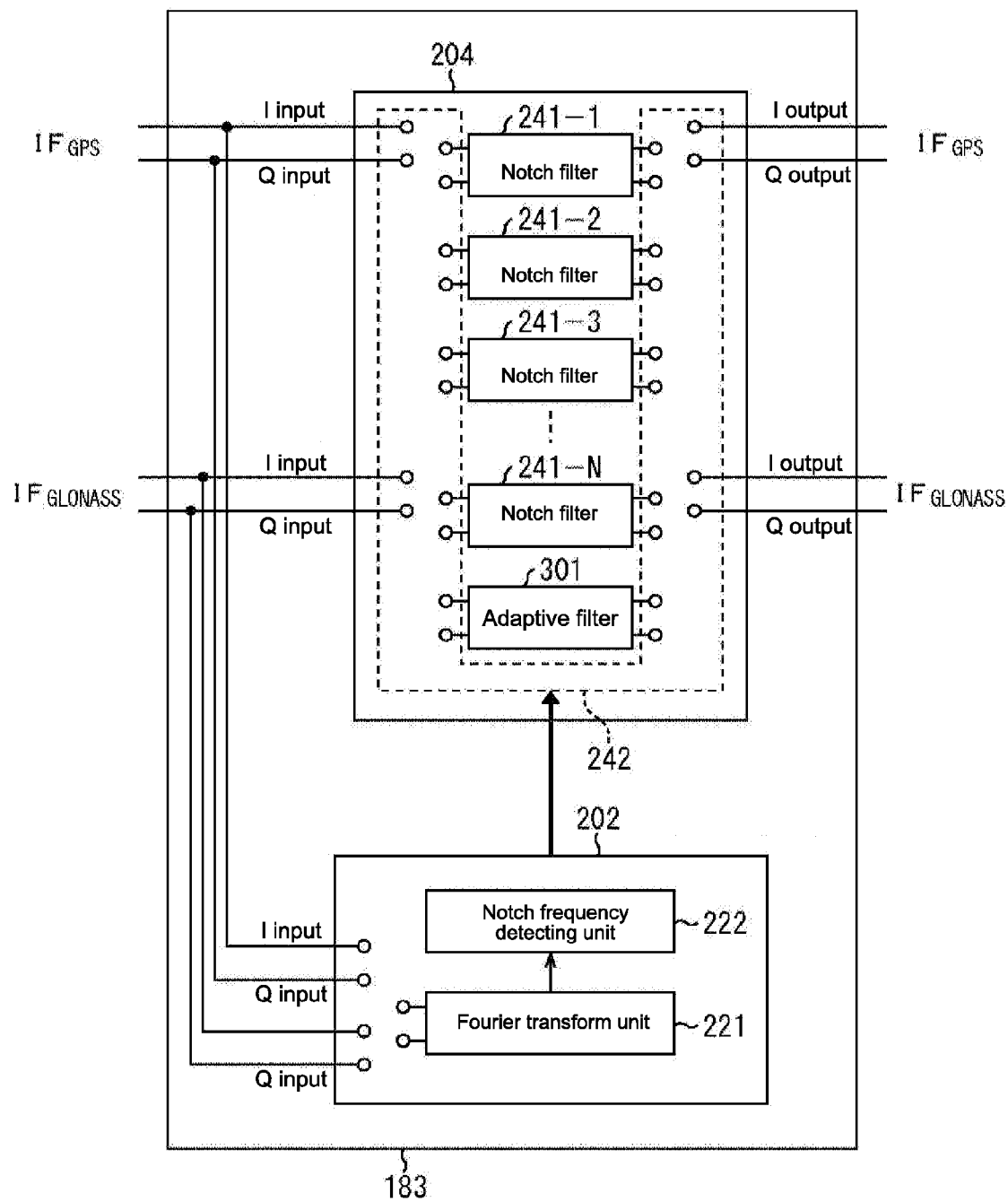
FIG. 11 is a block diagram showing still another configuration of the notch filter unit.

FIG. 11 shows still another configuration example of the notch filter unit 183.

Note that, also in FIG. 11, portions corresponding to the components shown in FIG. 3 are denoted by the same reference symbols and descriptions thereof will be appropriately omitted.

The notch filter unit 183 in FIG. 11 is different in the configuration from the notch filter unit 183 shown in FIG. 3 in that, in the filter processing unit 204, an adaptive filter 301 is newly added to the notch filter unit 183.

The adaptive filter 301 also functions as the noise removing unit like the notch filter 241. The notch filter 241 is suitable for, for example, mainly removing a noise having a single frequency or a narrowband noise where a noise band is narrow. In contrast, a Wiener filter is used as the adaptive filter 301 as will be described later, and hence not only a noise having a single frequency or a narrowband noise where a noise band is narrow, but also a wideband noise having deviation, for example, a wideband noise having a frequency changing over time can be effectively removed.

As in the above-mentioned other configurations, the filter controller 202 sets the notch frequency f0 or f0' to each notch filter 241. Further, the filter controller 202 controls connection of the notch filter 241 in the filter connecting unit 242.

In addition, based on the detection result of the notch frequency detecting unit 222, the filter controller 202 assigns the adaptive filter 301 to either one of the IF $_{GPS}$ signal and the IF $_{GLONASS}$ signal. If the adaptive filter 301 is assigned, an output at a final stage of the notch filter 241 and an input of the adaptive filter 301 are connected such that adaptive filter processing is executed after notch filter processing. Then, a signal after filter processing by the adaptive filter 301 is output to the subsequent stage.

Note that the adaptive filter 301 only needs to be assigned if necessary and does not necessarily need to be used. Further, the filter processing unit 204 may be provided with two adaptive filters 301 such that the adaptive filter 301 can be assigned to both of the IF $_{GPS}$ signal and the IF $_{GLONASS}$ signal depending on needs.

<Detailed Configuration Example of Adaptive Filter 301>

Figure 12:
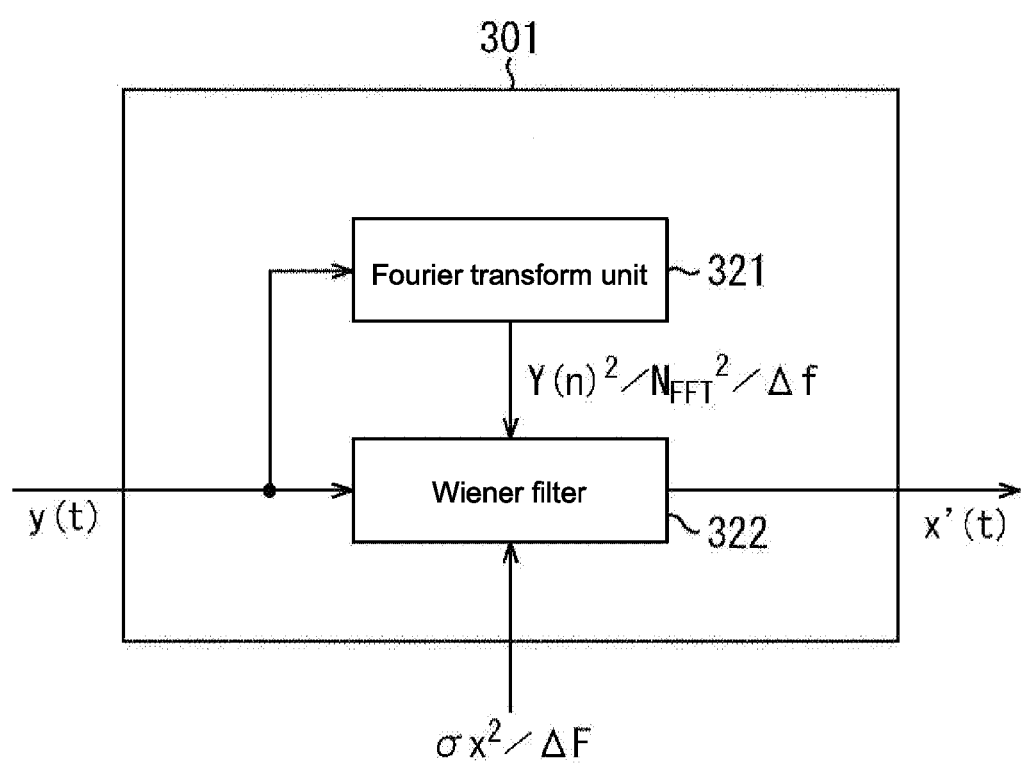
FIG. 12 is a block diagram showing a detailed configuration example of an adaptive filter.

FIG. 12 is a block diagram showing a detailed configuration example of the adaptive filter 301.

In FIG. 12, the discretization signal (IF $_{GPS}$ signal or IF $_{GLONASS}$ signal) that can include the external noise, which is an input signal input into the adaptive filter 301, is referred to as the discretization signal y(t) and the discretization signal after the noise is removed is referred to as the discretization signal x'(t).

The adaptive filter 301 includes a Fourier transform unit 321 (second Fourier transform unit) and a Wiener filter 322.

Processing by the Wiener filter 322 will be described.

Assuming that the ideal discretization signal based on the received transmission signal is denoted by x(t), the external noise is denoted by n(t), and the discretization signal based on the received transmission signal is denoted by y(t), a relationship among the discretization signal y(t), the ideal discretization signal x(t), and the external noise n(t) is expressed by Expression (3) below.

$$y(t)=x(t)+n(t) \quad (3)$$

By obtaining a discretization signal x'(t) that minimizes a mean squared error with respect to the ideal discretization signal x(t) shown in Expression (3), the Wiener filter 322 removes the external noise from the discretization signal y(t). Here, the Wiener filter 322 uses results Y(f), X(f), and N(f) of Fourier transform of the discretization signal y(t), the ideal discretization signal x(t), and the external noise n(t) and power spectra Py(f), Px(f), and Pn(f) to obtain the discretization signal x'(t). Hereinafter, it will be described more specifically.

In the ideal discretization signal x(t), a thermal noise is dominant, and hence, assuming that distribution of the amplitude is denoted by $\sigma x^2$, $\sigma x^2$ is a fixed value irrespective of the frequency. Therefore, the power spectrum Px(f) of the ideal discretization signal x(t) can be approximately expressed by Expression (4) below.

$$Px(f)=\sigma x^2/\Delta F \quad (4)$$

Here, ΔF is a bandwidth (e.g., 2 MHz) of the discretization signal. Although $\sigma x^2$ may be determined by observing the same signal as the transmission signal, for example, in a state in which a communication antenna is not connected, the present disclosure is not limited thereto. That is, Px(f) shown in Expression (4) indicates a power per unit frequency (e.g., 1 MHz). Hereinafter, the power spectrum Px(f) of the ideal discretization signal x(t) is referred to as a "reference power" because it indicates the power per unit frequency.

Further, the power spectrum Pn(f) of the external noise can be expressed by Expression (5) below based on Expression (3).

$$Pn(f)=Py(f)-Px(f) \quad (5)$$

Further, when Expression (4), Expression (5), and the Wiener filter theory are applied, a result W(f) of the Fourier transform of the Wiener filter can be expressed by Expression (6) below.

$$W(f) = 1/\{1 + Pn(f)/Px(f)\} \quad (6)$$
$$= Px(f)/Py(f)$$

Using the fast Fourier transform circuit in which a point number $N_{FFT}$ is set to, for example, a power-of-two, the reference power Px(n) can be set in advance by Expression (7) below based on Expression (4).

$$Px(n)=\sigma x^2/\Delta F \quad (7)$$

Further, using the fast Fourier transform circuit in which the point number $N_{FFT}$ is set to, for example, a power-of-two, the power spectrum Py(n) of the discretization signal y(t) can be determined by Expression (8) below.

$$Py(n)=Y(n)^2/N_{FFT}^2/\Delta f \quad (8)$$

In Expression (8), n is an integer of n=0 to $N_{FFT}-1$, and $N_{FFT}^2$ in Expression (8) is a correction coefficient that corrects an output of the fast Fourier transform circuit with the number of points. Further, Δf in Expression (8) is a resolution of the fast Fourier transform circuit and Δf is expressed by $\Delta f=Fs/N_{FFT}$ using a sampling frequency Fs. For example, assuming that the sampling frequency Fs=16[MHz] and the point number $N_{FFT}=64$, Δf becomes 250[kHz].

As described above, the Wiener filter 322 is capable of obtaining the discretization signal x'(t) that minimizes a mean squared error with respect to the ideal discretization signal x(t) based on the discretization signal y(t) (more exactly, Py(n) expressed by Expression (8)) by using the Wiener filter having the relationship shown in Expression (6).

Referring back to FIG. 12, the Fourier transform unit 321 performs a fast Fourier transform on the input discretization signal y(t) and derives and outputs the power spectrum $Py(n)=Y(n)^2/N_{FFT}^2/\Delta f$ based on the result Y(n) of the fast Fourier transform.

Although the Fourier transform unit 321 may include, for example, the fast Fourier transform circuit and an arithmetic circuit that derives the power spectrum Py(n) based on a result of the fast Fourier transform, the present disclosure is not limited thereto.

The Wiener filter 322 outputs the discretization signal x'(t) that minimizes a mean squared error with respect to the ideal discretization signal x(t) based on the input discretization signal y(t), the power spectrum Py(n) output from the Fourier transform unit 321, and the reference power Px(n).

Although noise processing performed by the notch filter unit 183 having the configuration shown in FIG. 11 is subsequent processing in Step S5 of the noise removing processing shown in FIG. 9, the adaptive filter 301 can be realized by performing the adaptive filter processing on the IF $_{GPS}$ signal or the IF $_{GLONASS}$ signal output from the notch filter 241 at a precedent stage. With this, the notch filter unit 183 is capable of effectively removing not only a noise having a single frequency or a narrowband noise where a noise band is narrow, but also a wideband noise having deviation, for example, a wideband noise having a frequency changing over time.

Although not shown in the drawings, the filter processing unit 204 of the notch filter unit 183 may further include both of the delay correction units 281A and 281B in FIG. 10 and the adaptive filter 301 in FIG. 11.

As described above, the reception apparatus 100 is capable of receiving the two kinds of transmission signals of the GPS signal and the GLONASS signal, the two kinds of transmission signals being the transmission signals transmitted from the positioning satellites. Further, the reception apparatus 100 includes the plurality of notch filters 241 as the noise removing unit that removes the external noise included in the received transmission signal, for example, a narrowband noise or a noise having a single frequency. The plurality of notch filters 241 are shared for both of the input IF $_{GPS}$ signal and IF $_{GLONASS}$ signal and assigned based on the detection result of the notch frequencies f0 and f0'.

Therefore, according to the reception apparatus 100, the notch filters 241 are not independently provided in two signal paths for the IF $_{GPS}$ signal and the IF $_{GLONASS}$ signal and are appropriately assigned depending on needs, and hence it is possible to suppress an increase in the circuit scale while reducing the external noise. In addition, the reception apparatus 100 can stably remove the external noise, and hence it is possible to more reliably demodulate the spectrum spread signal.

Note that, in the above-mentioned embodiments, the GPS signal and the GLONASS signal are received as two transmission signals in different frequency bands that are received by the reception apparatus 100. However, the combination of the plurality of transmission signals in the different frequency bands that are received by the reception apparatus 100 is not limited thereto. For example, transmission signals such as COMPASS being a satellite positioning system operated in China and Galileo being a satellite positioning system operated in European Union (EU) may be received by the reception apparatus 100.

Alternatively, the reception apparatus 100 may receive three or more transmission signals in different frequency bands at the same time instead of receiving the two transmission signals, appropriately assign the plurality of shared notch filters 241 depending on external noises included in those transmission signals, and perform a control such that the noises are removed.

<Configuration Example of Computer>

The above-mentioned sequence of processing can be executed by hardware or software. If at least part of the sequence of processing is executed by software, programs configuring the software are installed into a computer. Here, the computer includes a computer incorporated in dedicated hardware and, for example, a generally-used personal computer that installs various programs to be able to execute various functions.

Figure 13:
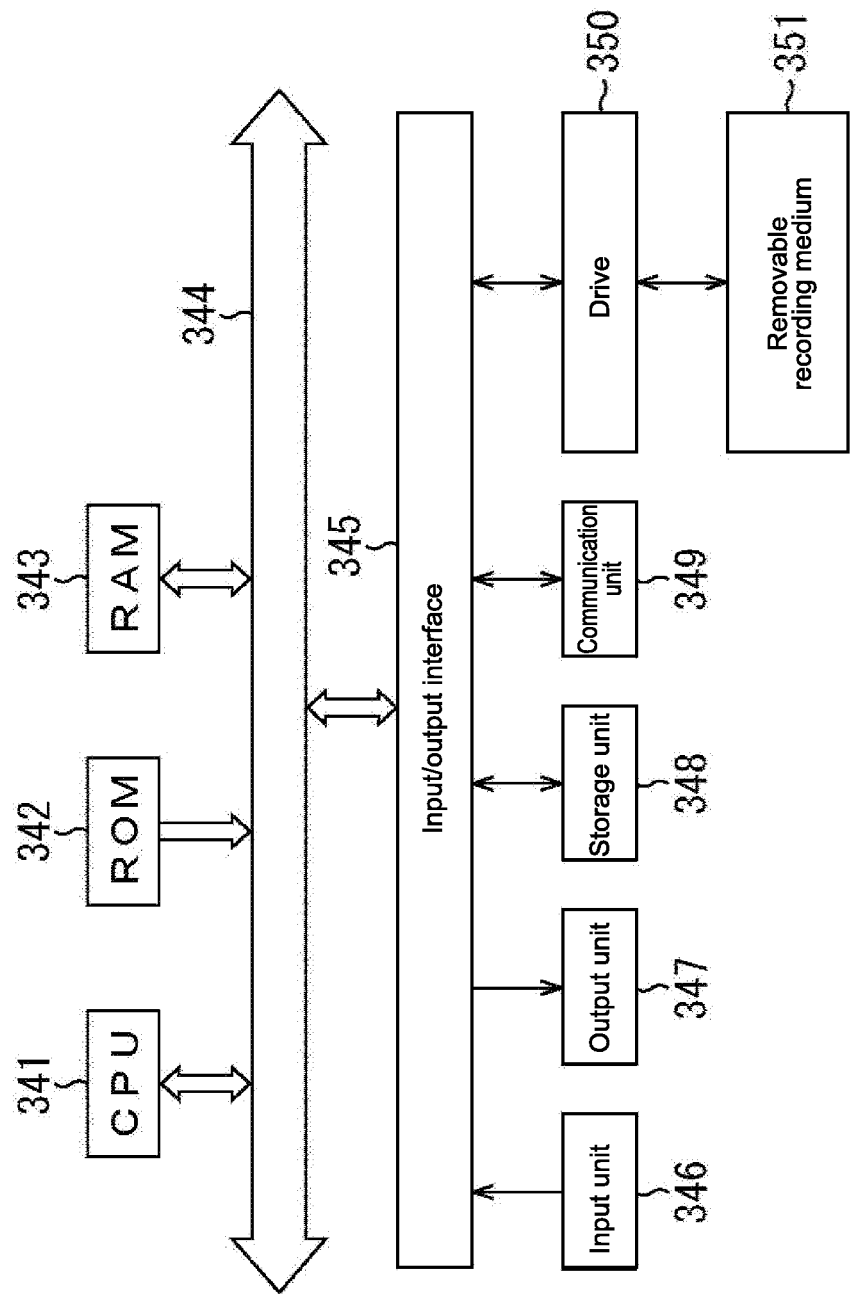
FIG. 13 is a block diagram showing a configuration example of an embodiment of a computer to which the present disclosure is applied.

FIG. 13 is a block diagram showing an exemplary configuration of hardware of a computer that executes at least part of the above-mentioned sequence of processing by programs.

In the computer, a central processing unit (CPU) 341, a read only memory (ROM) 342, and a random access memory (RAM) 343 are mutually connected via a bus 344.

To the bus 344, further connected is an input/output interface 345. To the input/output interface 345, connected are an input unit 346, an output unit 347, a storage unit 348, a communication unit 349, and a drive 350.

The input unit 346 includes a keyboard, a mouse, a microphone, and the like. The output unit 347 includes a display, a speaker, and the like. The storage unit 348 includes a hard disk, a non-volatile memory, and the like. The communication unit 349 includes a network interface and the like. The drive 350 drives a removable medium 351 such as a magnetic disc, an optical disc, a magneto-optical disk, and a semiconductor memory.

In the computer having the above-mentioned configuration, the above-mentioned sequence of processing is performed by the CPU 341 loading programs stored in, for example, the storage unit 348 into the RAM 343 via the input/output interface 345 and the bus 344 and executing the programs.

In the computer, by mounting the removable medium 351 on the drive 350, the programs can be installed into the storage unit 348 via the input/output interface 345. Alternatively, the programs can be received by the communication unit 349 and installed into the storage unit 348 via the wired or wireless transmission medium such as the Internet and digital satellite broadcasting. Otherwise, the programs can be installed into the ROM 342 or the storage unit 348 in advance.

Note that the programs executed by the computer may be processed in time series based on the order described herein or processed at a necessary timing, for example, when a call is made.

The embodiments of the present disclosure are not limited to the above-mentioned embodiments and may be variously changed without departing from the gist of the present disclosure.

For example, a combination of all or some of the above-mentioned embodiments may be adopted.

If each of the steps described above with reference to the flowchart includes a plurality types of processing, the plurality types of processing included in the step may be executed by a single apparatus or may be shared and executed by a plurality of apparatuses.

It should be noted that the present disclosure may also take the following configurations.

(1) A reception apparatus, including:

an intermediate frequency converter configured to convert a plurality of transmission signals in different frequency bands into a plurality of intermediate frequency signals having different intermediate frequencies, the plurality of transmission signals each being obtained by demodulating a spectrum-spread spectrum spread signal;

an analog-to-digital converter configured to discretize the plurality of intermediate frequency signals and output a plurality of discretization signals;

a plurality of noise removing units configured to remove a noise other than a normal thermal noise included in the plurality of discretization signals from the plurality of discretization signals; and a controller configured to detect the noise included in the plurality of discretization signals and set assignment of the plurality of noise removing units to the plurality of discretization signals based on a detection result thereof.

(2) The reception apparatus according to Item (1), in which the controller includes a first Fourier transform unit configured to perform a fast Fourier transform on each of the plurality of discretization signals, and a frequency detecting unit configured to detect, based on a result of the fast Fourier transform in the first Fourier transform unit, frequencies having amplitude of a predetermined value or more, and is configured to detect the noise in the plurality of discretization signals in order and assign the assignment of the plurality of noise removing units in descending order of the amplitude.

(3) The reception apparatus according to Item (1) or (2), in which
the plurality of noise removing units each include a notch filter configured to output a discretization signal obtained by attenuating a predetermined frequency component of the plurality of discretization signals, and
the controller is configured to set the frequencies having the amplitude of the predetermined value or more that are detected by the frequency detecting unit, in the notch filters as notch frequencies.

(4) The reception apparatus according to any one of Items (1) to (3), further including
a delay correction unit configured to correct a delay time such that an output timing after noise removing processing is fixed irrespective of the assignment of the plurality of noise removing units to the plurality of discretization signals.

(5) The reception apparatus according to any one of Items (1) to (4), further including
an adaptive filter configured to output a discretization signal that minimizes a mean squared error with respect to an ideal discretization signal in an ideal state not including the noise, in which
the controller is configured to further control processing by the adaptive filter after processing by the noise removing unit.

(6) The reception apparatus according to Item (5), in which the adaptive filter includes
a second Fourier transform unit configured to perform a fast Fourier transform on each of the plurality of discretization signals and derive a power spectrum based on a result of the fast Fourier transform, and
a Wiener filter configured to output, based on the discretization signal, the power spectrum output from the second Fourier transform unit, and a reference power per unit frequency, a discretization signal that minimizes the mean squared error with respect to the ideal discretization signal in the ideal state not including the noise.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus, comprising:
an intermediate frequency converter configured to convert a plurality of transmission signals in different frequency bands into a plurality of intermediate frequency signals having different intermediate frequencies, the plurality of transmission signals each being obtained by demodulating a spectrum-spread signal;
an analog-to-digital converter configured to discretize the plurality of intermediate frequency signals and output a plurality of discretization signals;
a plurality of noise removing units configured to remove a noise other than a normal thermal noise included in the plurality of discretization signals from the plurality of discretization signals; and
a controller configured to detect the noise included in the plurality of discretization signals and set assignment of the plurality of noise removing units to the plurality of discretization signals,
wherein the assignment is performed based on detection of frequencies of the plurality of discretization signals having amplitude greater than or equal to a predetermined value.

2. The reception apparatus according to claim 1, wherein the controller includes a first Fourier transform unit configured to perform a fast Fourier transform on each of the plurality of discretization signals, and
a frequency detecting unit configured to detect, based on a result of the fast Fourier transform in the first Fourier transform unit, frequencies having the amplitude of the predetermined value or more, and is configured to detect the noise in the plurality of discretization signals in order and perform the assignment of the plurality of noise removing units in descending order of the amplitude.

3. The reception apparatus according to claim 2, wherein the plurality of noise removing units each includes a notch filter configured to output a discretization signal obtained by attenuating a predetermined frequency component of the plurality of discretization signals, and
the controller is configured to set the frequencies having the amplitude of the predetermined value or more that are detected by the frequency detecting unit, in the notch filters as notch frequencies.

4. The reception apparatus according to claim 1, further comprising a delay correction unit configured to correct a delay time such that an output timing after noise removing processing is fixed irrespective of the assignment of the plurality of noise removing units to the plurality of discretization signals.

5. The reception apparatus according to claim 1, further comprising an adaptive filter configured to output a discretization signal that minimizes a mean squared error with respect to an ideal discretization signal in an ideal state not including the noise, wherein the controller is configured to further control processing by the adaptive filter after processing by the noise removing unit.

6. The reception apparatus according to claim 5, wherein the adaptive filter includes a second Fourier transform unit configured to perform a fast Fourier transform on each of the plurality of discretization signals and derive a power spectrum based on a result of the fast Fourier transform, and a Wiener filter configured to output, based on the discretization signal, the power spectrum output from the second Fourier transform unit, and a reference power per unit frequency, a discretization signal that minimizes the mean squared error with respect to the ideal discretization signal in the ideal state not including the noise.

7. A reception apparatus, comprising:
an intermediate frequency converter configured to convert a plurality of transmission signals in different frequency bands into a plurality of intermediate frequency signals having different intermediate frequencies, the plurality of transmission signals each being obtained by demodulating a spectrum-spread signal;
an analog-to-digital converter configured to discretize the plurality of intermediate frequency signals and output a plurality of discretization signals;
a plurality of noise removing units configured to remove a noise other than a normal thermal noise included in the plurality of discretization signals from the plurality of discretization signals; and
a controller configured to detect the noise included in the plurality of discretization signals and set assignment of the plurality of noise removing units to the plurality of discretization signals based on a detection result;
wherein the controller includes a first Fourier transform unit configured to perform a fast Fourier transform on each of the plurality of discretization signals; and
a frequency detecting unit configured to detect, based on a result of the fast Fourier transform in the first Fourier transform unit, frequencies having amplitude of a predetermined value or more, and is configured to detect the noise in the plurality of discretization signals in order and assign the assignment of the plurality of noise removing units in descending order of the amplitude.

8. A reception apparatus, comprising:

an intermediate frequency converter configured to convert a plurality of transmission signals in different frequency bands into a plurality of intermediate frequency signals having different intermediate frequencies, the plurality of transmission signals each being obtained by demodulating a spectrum-spread signal;

an analog-to-digital converter configured to discretize the plurality of intermediate frequency signals and output a plurality of discretization signals;

a plurality of noise removing units configured to remove a noise other than a normal thermal noise included in the plurality of discretization signals from the plurality of discretization signals;

a controller configured to detect the noise included in the plurality of discretization signals and set assignment of the plurality of noise removing units to the plurality of discretization signals based on a detection result; and a delay correction unit configured to correct a delay time such that an output timing after noise removing processing is fixed irrespective of the assignment of the plurality of noise removing units to the plurality of discretization signals.

9. A reception apparatus, comprising:

an intermediate frequency converter configured to convert a plurality of transmission signals in different frequency bands into a plurality of intermediate frequency signals having different intermediate frequencies, the plurality of transmission signals each being obtained by demodulating a spectrum-spread signal;

an analog-to-digital converter configured to discretize the plurality of intermediate frequency signals and output a plurality of discretization signals;

a plurality of noise removing units configured to remove a noise other than a normal thermal noise included in the plurality of discretization signals from the plurality of discretization signals;

a controller configured to detect the noise included in the plurality of discretization signals and set assignment of the plurality of noise removing units to the plurality of discretization signals based on a detection result; and an adaptive filter configured to output a discretization signal that minimizes a mean squared error with respect to an ideal discretization signal in an ideal state not including the noise, wherein the controller is configured to further control processing by the adaptive filter after processing by the noise removing unit.

* * * * *